(12) United States Patent
Kim et al.

(10) Patent No.: US 9,544,653 B2
(45) Date of Patent: Jan. 10, 2017

(54) WEB-BROWSING METHOD, AND IMAGE DISPLAY DEVICE USING SAME

(75) Inventors: Jaeuk Kim, Seoul (KR); Gowoon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 136 days.

(21) Appl. No.: 13/885,354

(22) PCT Filed: Sep. 27, 2011

(86) PCT No.: PCT/KR2011/007092
§ 371 (c)(1),
(2), (4) Date: May 17, 2013

(87) PCT Pub. No.: WO2012/067344
PCT Pub. Date: May 24, 2012

(65) Prior Publication Data
US 2013/0239149 A1 Sep. 12, 2013

Related U.S. Application Data

(60) Provisional application No. 61/415,165, filed on Nov. 18, 2010.

(30) Foreign Application Priority Data

Nov. 29, 2010 (KR) .......................... 10-2010-0119666

(51) Int. Cl.
*G06F 3/00* (2006.01)
*G06F 13/00* (2006.01)
(Continued)

(52) U.S. Cl.
CPC .... *H04N 21/4782* (2013.01); *G06F 17/30861* (2013.01); *G06F 17/30876* (2013.01);
(Continued)

(58) Field of Classification Search
CPC H04N 21/431; H04N 21/4312; H04N 21/472; H04N 21/4782; H04N 21/4858; H04N 21/482; H04N 21/4622; G06F 17/30861; G06F 17/30876; G06F 17/30884
(Continued)

(56) References Cited

U.S. PATENT DOCUMENTS 5,880,733 A * 3/1999 Horvitz et al. ............... 715/850
2001/0049700 A1* 12/2001 Ichikura ....................... 707/512
(Continued)

FOREIGN PATENT DOCUMENTS

| CN | 1623134 A | 6/2005 |
|----|-----------|--------|
| CN | 101006714 A | 7/2007 |

(Continued)

OTHER PUBLICATIONS

John Marshall, "Bookmark Previews 0.8.0", Add-ons for Firefox, Feb. 7, 2009, XP055106704, pp. 1-2.
(Continued)

*Primary Examiner* — Jeremy Duffield
(74) *Attorney, Agent, or Firm* — Birch, Stewart, Kolasch & Birch, LLP

(57) ABSTRACT

Provided is a method of performing web browsing in a video display device. The method includes: displaying on a screen a first object that displays a video of a broadcast signal received through a tuner and a second object that includes at least one application; selecting a web browsing application in the second object; displaying on a screen a web browser including thumbnail images corresponding to a plurality of web pages, respectively, in response to the selection of the application; selecting at least one of the thumbnail images in the web browser; and displaying a web page corresponding to the selected thumbnail image.

24 Claims, 32 Drawing Sheets

(51) Int. Cl.

| | |
|---|---|
| *H04N 5/445* | (2011.01) |
| *H04N 21/4782* | (2011.01) |
| *H04N 21/431* | (2011.01) |
| *H04N 21/472* | (2011.01) |
| *H04N 1/00* | (2006.01) |
| *G06F 17/30* | (2006.01) |
| *H04N 21/2362* | (2011.01) |
| *H04N 21/2365* | (2011.01) |
| *H04N 21/462* | (2011.01) |
| *H04N 21/482* | (2011.01) |
| *H04N 21/6437* | (2011.01) |
| *H04N 21/443* | (2011.01) |
| *H04N 21/485* | (2011.01) |

(52) U.S. Cl.
CPC ... *G06F 17/30884* (2013.01); *H04N 1/00442* (2013.01); *H04N 21/2362* (2013.01); *H04N 21/2365* (2013.01); *H04N 21/431* (2013.01); *H04N 21/4312* (2013.01); *H04N 21/4316* (2013.01); *H04N 21/4438* (2013.01); *H04N 21/4622* (2013.01); *H04N 21/472* (2013.01); *H04N 21/482* (2013.01); *H04N 21/4858* (2013.01); *H04N 21/6437* (2013.01); *H04N 5/44582* (2013.01)

(58) Field of Classification Search
USPC .......................................... 725/37, 38, 41, 51
See application file for complete search history.

(56) References Cited

U.S. PATENT DOCUMENTS

| | | | |
|---|---|---|---|
| 2002/0049978 A1* | 4/2002 | Rodriguez et al. ............. 725/86 |
| 2003/0169294 A1* | 9/2003 | Vatula et al. ................... 345/764 |
| 2005/0257166 A1* | 11/2005 | Tu ................................... 715/787 |
| 2005/0273494 A1 | 12/2005 | Uchide |
| 2006/0080725 A1* | 4/2006 | Paila ............................. 725/135 |
| 2006/0230356 A1* | 10/2006 | Sauve ................... G06F 3/0481 |
| | | | 715/777 |
| 2006/0265417 A1* | 11/2006 | Amato et al. ................. 707/102 |
| 2007/0080940 A1* | 4/2007 | Aoki et al. .................... 345/158 |
| 2008/0162545 A1* | 7/2008 | Austin ............... H04N 21/4147 |
| 2009/0043842 A1 | 2/2009 | Rhim et al. |
| 2010/0030901 A1* | 2/2010 | Hallberg et al. .............. 709/228 |
| 2010/0153999 A1* | 6/2010 | Yates ................. H04N 21/4532 |
| | | | 725/39 |
| 2010/0162168 A1* | 6/2010 | Lee ...................... G06Q 10/107 |
| | | | 715/821 |
| 2010/0180188 A1* | 7/2010 | Bostick ............ G06F 17/30899 |
| | | | 715/207 |

FOREIGN PATENT DOCUMENTS

| | | |
|---|---|---|
| KR | 10-2006-0049552 A | 5/2006 |
| KR | 10-0869889 B1 | 11/2008 |
| KR | 10-2009-0014945 A | 2/2009 |
| KR | 10-2010-0094836 A | 8/2010 |

OTHER PUBLICATIONS

Brent Sheets, "Apple Safari 4 Beta Top Sites", Mactoids for Apple Macintosh, Dec. 14, 2009-Jul. 26, 2012, Retrieved from the Internet Jul. 30, 2015, pp. 1-3, XP55205433.

Raju, "TooManyTabs-Management Extension for Chrome", Technology Personalized, Dec. 11, 2009, retrieved from the Internet on Mar. 11, 2014, 5 pages, XP55106748.

\* cited by examiner

WEB-BROWSING METHOD, AND IMAGE DISPLAY DEVICE USING SAME

CROSS-REFERENCE TO RELATED APPLICATIONS

The present application claims priority under 35 U.S.C. 119 and 35 U.S.C. 365 to U.S. patent Application No. 61/415,165 (filed on Nov. 18, 2010) and Korean Patent Application No. 10-2010-0119666 (filed on Nov. 29, 2010), which are hereby expressly incorporated by reference in their entirety.

TECHNICAL FIELD

The present invention relates to a method of performing web browsing in a video display device.

BACKGROUND ART

Recently, digital TV services using a wired or wireless communication network are widely spread. The digital TV services may provide various services that typical analog broadcasting services cannot provide.

For example, in the case of Internet Protocol Television (IPTV) service, i.e. one type of the digital TV services, it provides interactive contents to allow a user actively select the type and viewing time of a program. The IPTV service may provide various additional services such as internet search, home shopping, and online gaming, on the basis of such an interactivity.

DISCLOSURE

Technical Problem

Embodiments provide a web browsing method for improving user's convenience and a video display device using the same.

Technical Solution

In one embodiment, a method of performing web browsing in a video display device includes: displaying on a screen a first object that displays a video of a broadcast signal received through a tuner and a second object that includes at least one application; selecting a web browsing application in the second object; displaying on a screen a web browser including thumbnail images corresponding to a plurality of web pages, respectively, in response to the selection of the application; selecting at least one of the thumbnail images in the web browser; and displaying a web page corresponding to the selected thumbnail image.

In another embodiment, a video display device includes: a tuner receiving a broadcast signal; a storage unit storing URLs and thumbnail images respectively corresponding to a plurality of web registered pages at a user's request; a user interface unit selecting a web browsing application from a user; a display unit displaying on a screen a first object that displays a video of a broadcast signal received through the tuner and a second object that includes the web browsing application, and displaying on a screen a web browser including the thumbnail images in response to the selection of the web browsing application; and a network interface unit accessing a corresponding server by using the stored URL in order to display a web page corresponding to the selected thumbnail image when one of the thumbnail images is selected.

In further another embodiment, a computer readable recording medium storing a program that executes the method.

Advantageous Effects

According to an embodiment of the present invention, when an application of a web browser is selected, by displaying thumbnail images corresponding to a plurality of pre-registered web pages on a screen so as to select the thumbnail image of the web page that a user wants, a video display device such as TV may provide a web browsing function having improved convenience to a user.

MODE FOR INVENTION

Hereinafter, a web browsing method and a video display device using the same according to an embodiment of the present invention will be described in more detail with reference to the accompanying drawings.

The video display device according to an embodiment of the present invention, for example, as an artificial intelligent video display device having a computer supporting function in addition to a broadcast receiving function, may have a convenient interface such as a handwriting type input device, a touch screen, or a spatial remote controller by adding an internet function while fulfilling the broadcast receiving function. Moreover, the video display device may perform functions such as e-mail, web browsing, banking, or gaming in access to an internet and computer with the support of a wired or wireless internet function. A standardized general OS may be used for such various functions.

Accordingly, for example, since the video display device of the present invention adds or deletes various applications on a general OS kernel without restrictions, it may perform various user-friendly functions. The video display device, more specifically, for example, may be a network TV, an HBBTV, and a smart TV, and if necessary, may be applicable to a smart phone.

Furthermore, with reference to the accompanying drawings and the contents relating thereto, embodiments of the present invention will be described in more detail, but the present invention is not limited to the embodiments.

The terms used in this specification selects currently widely used available general terms but may vary according to the intentions or practices of those skilled in the art or the advent of new technologies. Additionally, in certain cases, the applicant may arbitrarily select terms, and in this case, their meanings will be described in the corresponding description part of the present invention. Accordingly, the terms used in this specification should be interpreted on the basis of the practical implications that the terms have and the contents across the specification.

Figure 1:
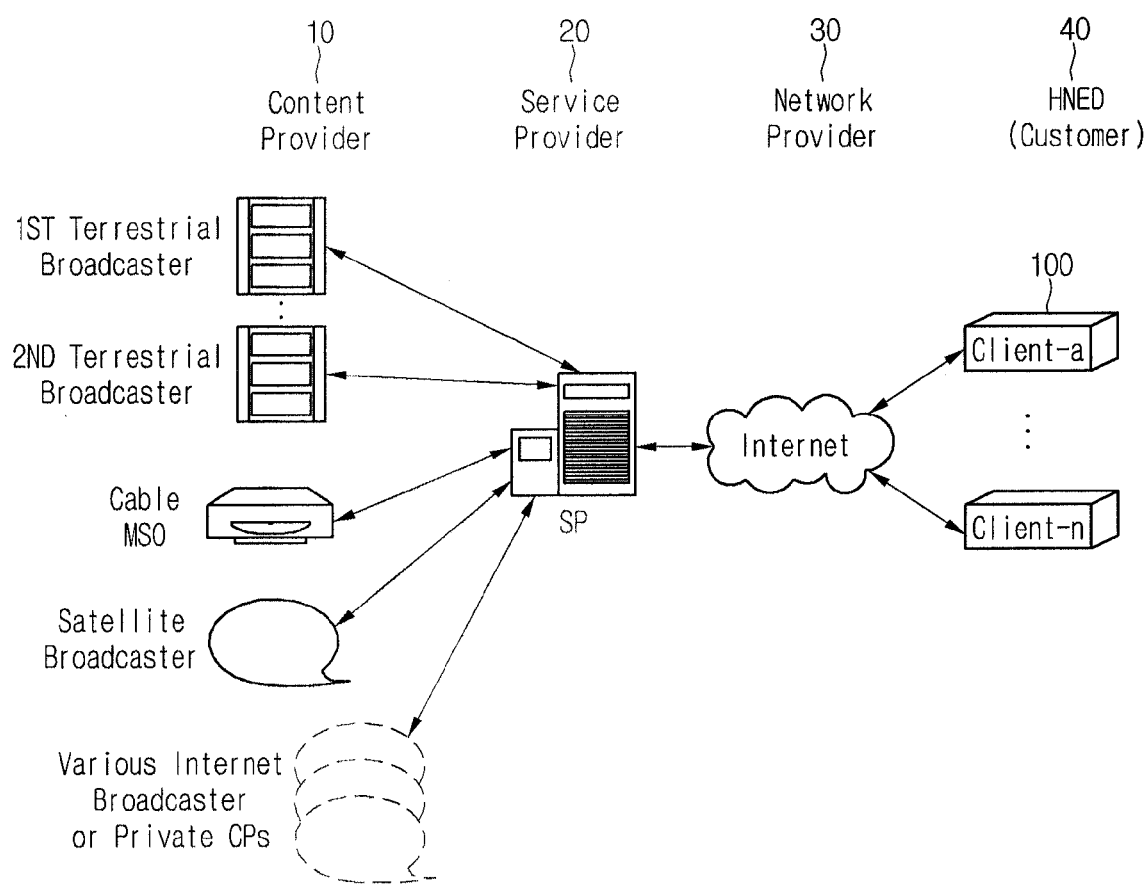
FIG. 1 is a view illustrating a configuration of a broadcasting system according to an embodiment of the present invention.

FIG. 1 is a view illustrating a configuration of a broadcasting system. That is, FIG. 1 illustrates one example of an entire broadcasting system including a video display device according to an embodiment of the present invention.

Referring to FIG. 1, a broadcasting system includes a Content Provider (CP) 10, a Service Provider (SP) 20, a Network Provider (NP) 30, and an HNED 40.

The HNED 40 may correspond to a client 100, i.e. a video display device, according to an embodiment of the present invention, and for example, the client 100 may be a network TV, a smart TV, and an IPTV.

Moreover, the CP 10 produces and provides various contents. As shown in FIG. 1, the CP 10 may be a terrestrial broadcaster, a cable System Operator (SO), a Multiple System Operator (MSO), a satellite broadcaster, and an Internet broadcaster.

Additionally, the CP 10 may provide various applications besides broadcasting contents. In this regard, description will be made in more detail.

The CP may package the contents that the CP 10 provides as service, and then, may provide them. For example, the SP 20 may package first terrestrial broadcasts, second terrestrial broadcasts, cable MSOs, satellite broadcasts, various internet broadcasters, and applications, and then, may provide them to a user.

Additionally, the SP 20 may provide service to the client 100 through a unicast or multicast method.

The unicast method is a method of transmitting data between one transmitter and one receiver via one to one communication. For example, in the case of the unicast method, when a receiver requests data to a server, the server may transmit data to the receiver in response to the request, The multicast method is a method of transmitting data to a plurality of receivers in a specific group. For example, a server may transmit data to a plurality of pre-registered receivers at the same time. In order for such multicast registration, the Internet Group Management Protocol (IGMP) may be used.

The NP 30 may provide a network to the client 100 in order to provide the above service, and the client 100 may establish a Home Network End User (HNED) in order to receive the service.

As a means for protecting contents transmitted from the system, conditional access or content protection may be used. As one example of the conditional access or the content protection, CableCARD and Downloadable Conditional Access System (DCAS) may be used.

Moreover, the client 100 may provide contents via a network. In this case, the client 100 may become a CP, and the CP 10 may receive contents from the client 100. Accordingly, interactive contents services or data services may become available.

According to an embodiment of the present invention, the CP 10 may provide network services such as Social Network Site (SNS), blog, micro blog, or instant messenger.

For example, the CP 10 providing the SNS service may include a server (not shown) for storing various kinds of contents such as texts that a plurality of users write in a Social Network Site (SNS) or uploaded images.

In more detail, a user may access the server of the CP providing the SNS service through a video display device and designates accounts that the user wants, so that the messages crated by the designated accounts may be confirmed.

Additionally, when a user requests the SNS service, a video display device, i.e. the client 100, accesses the server of the CP 10, receives the messages of the designated accounts, and then, arranges and displays the receives message sequentially, for example, from top to the bottom, according to the order in which a corresponding message is written.

Figure 2:
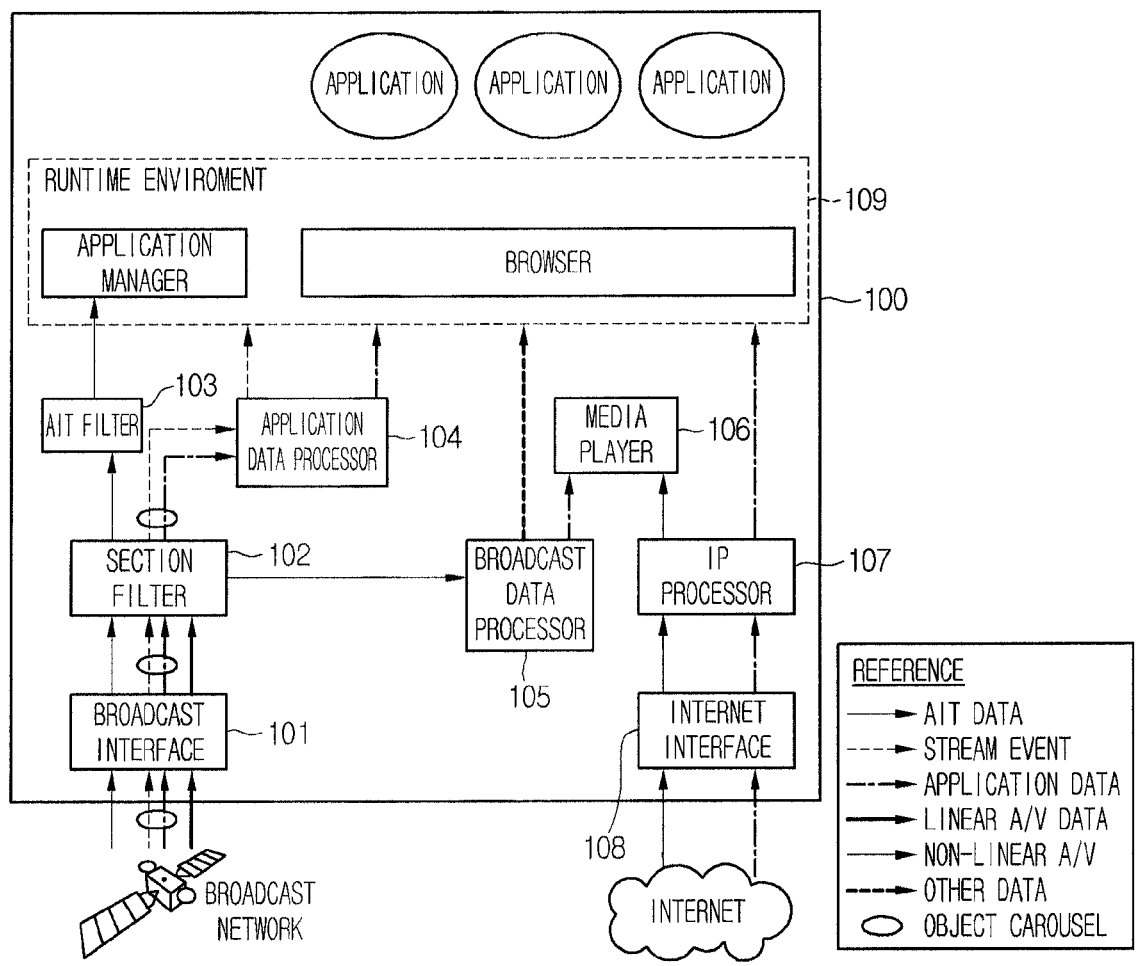
FIG. 2 is a view illustrating a configuration of a broadcasting system according to another embodiment of the present invention.

Referring to FIG. 2, the video display device 100 corresponding to the client shown in FIG. 1 may be connected to a broadcast network and an Internet network.

For example, the video display device 100 may include a broadcast interface 101, a section filter 102, an AIT filter 103, an application data processing unit 104, a broadcast data processing unit 105, a media player 106, an internet protocol processing unit 107, an internet interface 108, and a runtime module 109.

Moreover, the broadcast interface 101 of the video display device 100 may receive Application Information Table (AIT) data, real-time broadcast content, application data or stream events, and the real-time broadcast content may be Linear A/V Content.

The section filter 102 may perform section filtering on four data received through the broadcast interface 101 so as to transmit AIT data to the AIT filter 103, transmit linear A/V content to the broadcast data processing unit 105, and transmit stream event and application data to the application data processing unit 104.

The internet interface 108 may receive Non-Linear A/V content and application data, and for example, the Non-Linear A/V content may be Content On Demand (COD) application.

Moreover, the Non-Linear A/V content may be transmitted to the media player 106 and the application data may be transmitted to the runtime module 109.

Additionally, the runtime module 109 may include an application manager and a browser. The application manager may control a life cycle for interactive application by using AIT data and the browser may display and process the interactive application.

Figure 3:
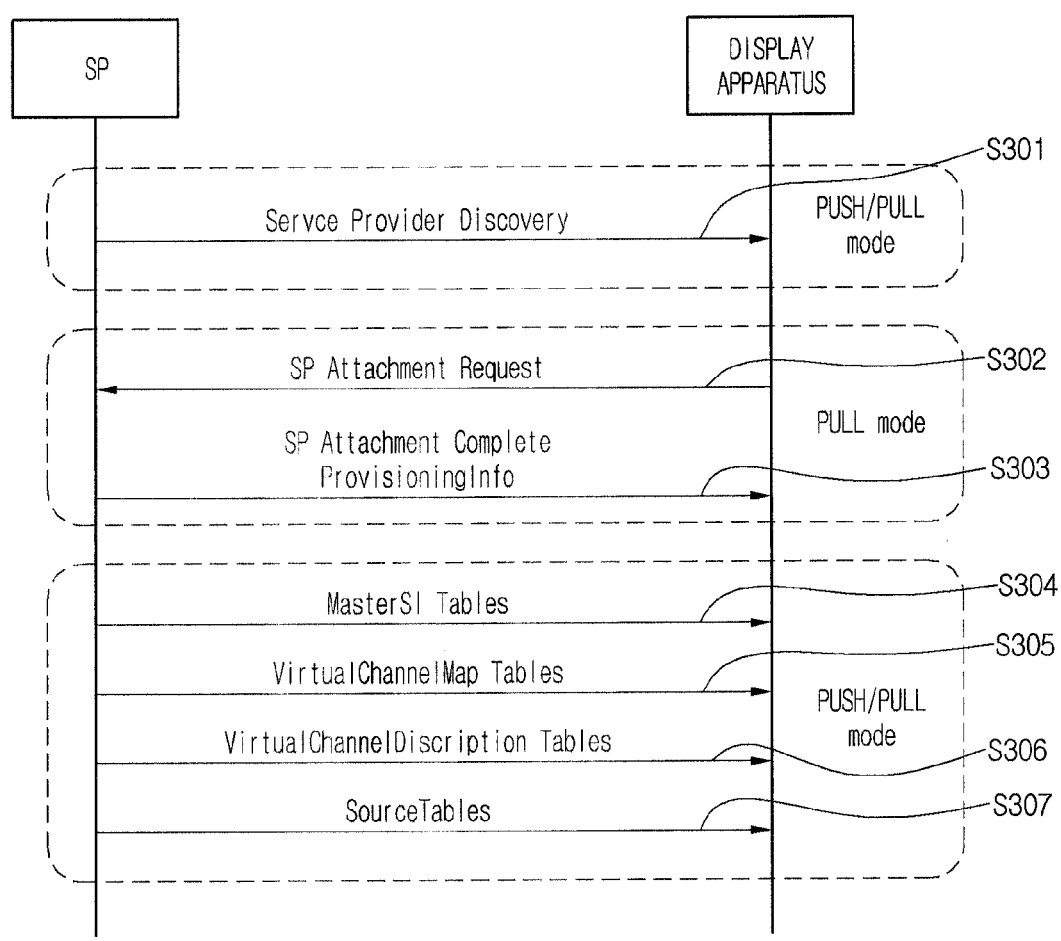
FIG. 3 is a view illustrating a data transmitting/receiving method between a video display device and a service provider according to an embodiment of the present invention.

FIG. 3 is a view illustrating a data transmitting/receiving method between a video display device and a service provider according to an embodiment of the present invention.

Referring to FIG. 3, a SP performs a service provider discovery operation in operation S301. A video display device transmits an SP attachment request signal in operation S302. After the SP attachment is completed, the video display device receives provisioning information in operation S303. Furthermore, the video display device receives the a master SI table from the SP in operation S304, receives a Virtual channel map table in operation S305, receives a virtual channel description table in operation S306, and receives a source table in operation S307.

For example, the SP discovery may mean a process that SPs providing IPTV related services search for a server providing information on their services.

A method of finding an address list for receiving information on a Service Discovery (SD) server may be the following three, for example. First, an address preset in a video display device or an address set by a user's manual operation may be used. Second, a DHCP based SP discovery method may be used. Third, a DNS SRV-based SP discovery method may be used.

Additionally, the video display device accesses the server of the address obtained through one of the above three methods, receives a service provider discovery record containing information necessary for service discovery for each SP, and performs a service discovery operation by using it. Moreover, the above processes may be available in a push mode or a pull mode.

Furthermore, the video display device may access an SP attachment server designated as an SP attachment locator of an SP discovery record and then may perform a registration procedure (or a service attachment procedure).

Also, the video display device accesses an authentication service server of an SP designated as the SP authentication locator so as to perform an additional authentication procedure and then, performs a service authentication procedure.

After the service attachment procedure is successful, data transmitted to the video display device may be in a provisioning information table format.

During the service attachment process, the video display device includes its ID and position information in data transmitted to a server and provides them, and a Service attachment server may specify a service that the video display device subscribes on the basis of the data.

Address information for obtaining Service Information that the video display device is to receive may be provided in a provisioning information table format. Additionally, the address information may correspond to access information of a master SI table, and in this case, it may be easy to provide subscriber-specific customized service.

Also, the Service Information may include a master SI table record managing access information and version for a virtual channel map, a virtual channel map table providing a service list of a package format, a virtual channel description table including detailed information of each channel, and a source table including access information for accessing actual service.

Figure 4:
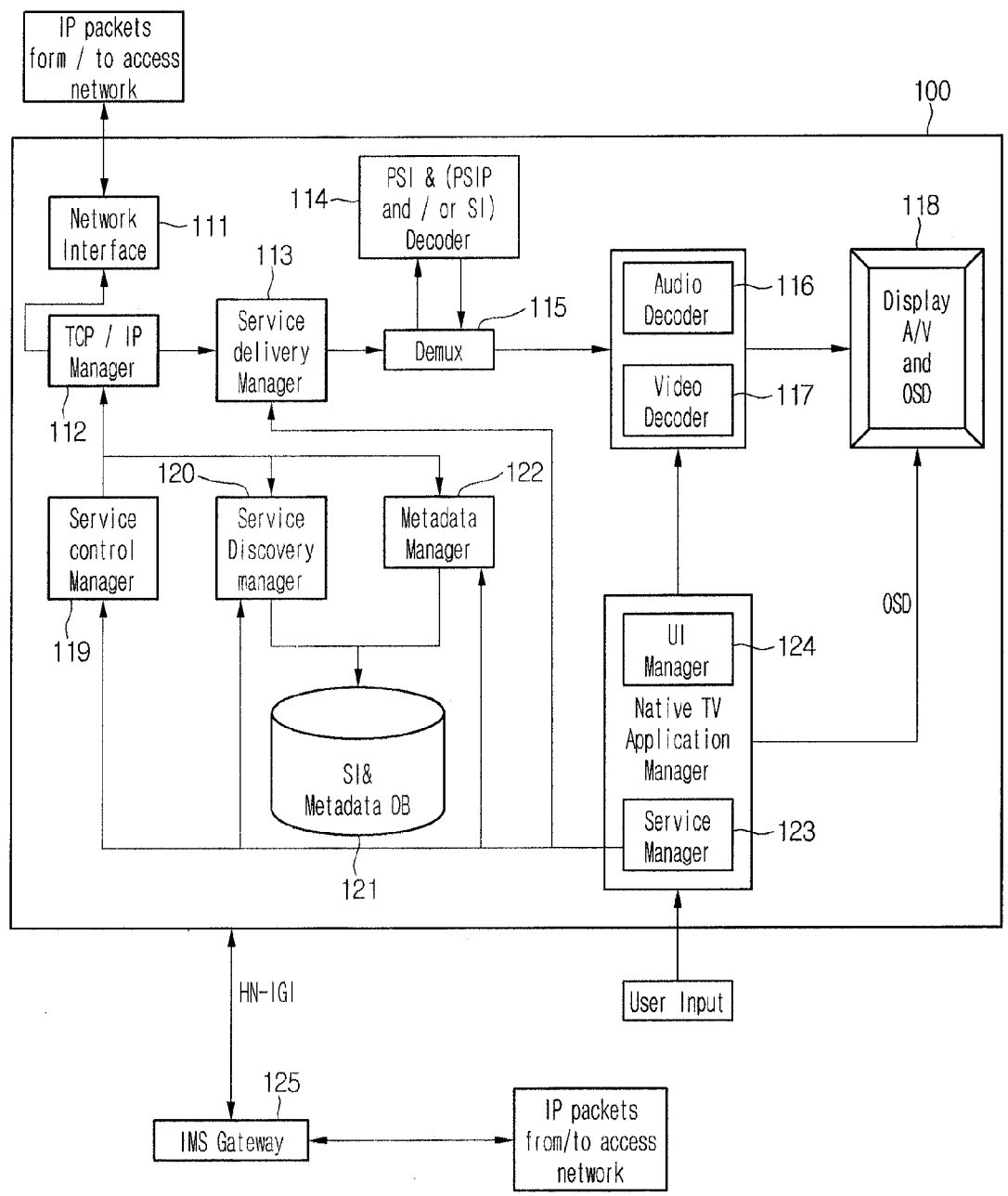
FIG. 4 is a block diagram illustrating a configuration of a video display device according to an embodiment of the present invention.

FIG. 4 is a block diagram illustrating a configuration of a video display device according to an embodiment of the present invention.

Referring to FIG. 4, the video display device 100 includes a Network Interface 111, a TCP/IP Manager 112, a Service Delivery Manager 113, a Demux 115, a PSI&(PSIP and/or SI) decoder 114, an Audio Decoder 116, a Video Decoder 117, a Display A/V and OSD Module 118, a Service Control Manager 119, a Service Discovery Manager 120, a Metadata Manager 122, an SI&Metadata DB 121, a UI manager 124, and a service manager 123.

The network interface unit 111 may receive packets from a network, and may transmit packets to a network. That is, the network interface unit 111 may receive services and contents from a SP via a network.

The TCP/IP manager 112 may be involved in delivering packets received by the video display device 100 and packets that the video display device 100 transmits, from a source to a destination. Also, the TCP/IP manager 112 classifies the received packets in order to correspond to a proper protocol and outputs packets classified into the service delivery manager 115, the service discovery manager 120, the service control manager 119, and the metadata manager 122.

Moreover, the service delivery manager 113 is responsible for controlling the received service data. For example, when controlling real-time streaming data, the service delivery manager 113 may use the RTP/RTCP.

When transmitting the real-time streaming through the RTP, the service delivery manager 113 may parse the received data packet according to the RTP and may transmit them to the demux 115, or may store them in the SI&Metadata DB 121 according to a control of the service manager 123. Additionally, the service delivery manager 113 may feed back the network received information to a server through the RTCP.

The demux 115 may demultiplex the received packet into audio, video, and Program Specific Information (PSI) data and may transmit them into the audio/video decoders 116 and 117 and the PSI&(PSIP and/or SI) Decoder 114, respectively.

The PSI&(PSIP and/or SI) Decoder 114 may decode service information such as the PSI and, for example, may receive the PSI section, the Program and Service Information Protocol (PSIP) section, or the Service Information (SI) section, which are demultiplexed in the demux 115, and then may decode them.

Additionally, the PSI&(PSIP and/or SI) Decoder 114 may decode the received sections in order to create a database for service information, and then may store the database for service information in the SI&Metadata DB 121.

The audio/video decoders 116 and 117 may decode the received video data and audio data from the demux 115, and may provide the decoded audio and video data to a user through the display unit 118.

Moreover, the UI manager 124 and the service manager 123 may manage the overall state of the video display device 100 and may provide a user interface, and also may manage other managers.

For example, the UI manager 124 may provide a Graphic User Interface (GUI) for user through an On Screen Display (OSD), and may receive a key input from a user to perform a receiver operation according to the input. Additionally, when receiving a key input for channel selection from a user, the UI manager 124 may transmit the key input signal to the service manager 123.

The service manager 123 may control managers relating to services such as the service delivery manager 113, the service discovery manager 120, the service control manager 119, and the metadata manager 122.

Additionally, the service manager 123 creates a channel map and selects a channel by using the channel map according to the received key input from the user interface manager 124.

Also, the service manager 123 may receive service information of a channel from the PSI&(PSIP and/or SI) Decoder 114 and may set the audio/video Packet Identifier (PID) of the selected channel in the demux 115.

The service discovery manager 120 may provide information necessary for selecting an SP that provides services. For example, when receiving a signal relating to channel selection from the service manager 123, the service discovery manager 120 may find a service by using the received signal.

Additionally, the service control manager 119 is responsible for selection and control of service. For example, when a user selects Live Broadcasting service such as an existing broadcasting system, the service control manager 119 uses the IGMP or the RTSP and when a user selects a service such as Video On Demand (VOD), the service control manager 119 uses the RTSP in order to select and control the service.

The RTSP may provide a trick mode for real-time streaming and the service control manager 119 may initialize and manage the sessions passing through the IMC gateway by using the IP Multimedia Subsystem (IMS) and the Session Initiation Protocol (SIP).

The metadata manager 122 may manage metadata relating to service and may store the metadata in the SI&Metadata DB 711.

Additionally, Also, the SI&Metadata DB 121 may store the service information decoded by the PSI&(PSIP and/or SI) Decoder 114, the metadata that the metadata manager 122 manages, and the information necessary for selecting SPs that the service discovery manager 120 provides.

Moreover, the SI&Metadata DB 121 may store setup data for system and, for example, may be realized with Non-Volatile RAM (NVRAM) or flash memory.

Furthermore, the IG 750 may be a gateway having functions necessary for accessing IMS based IPTV service.

Figure 5:
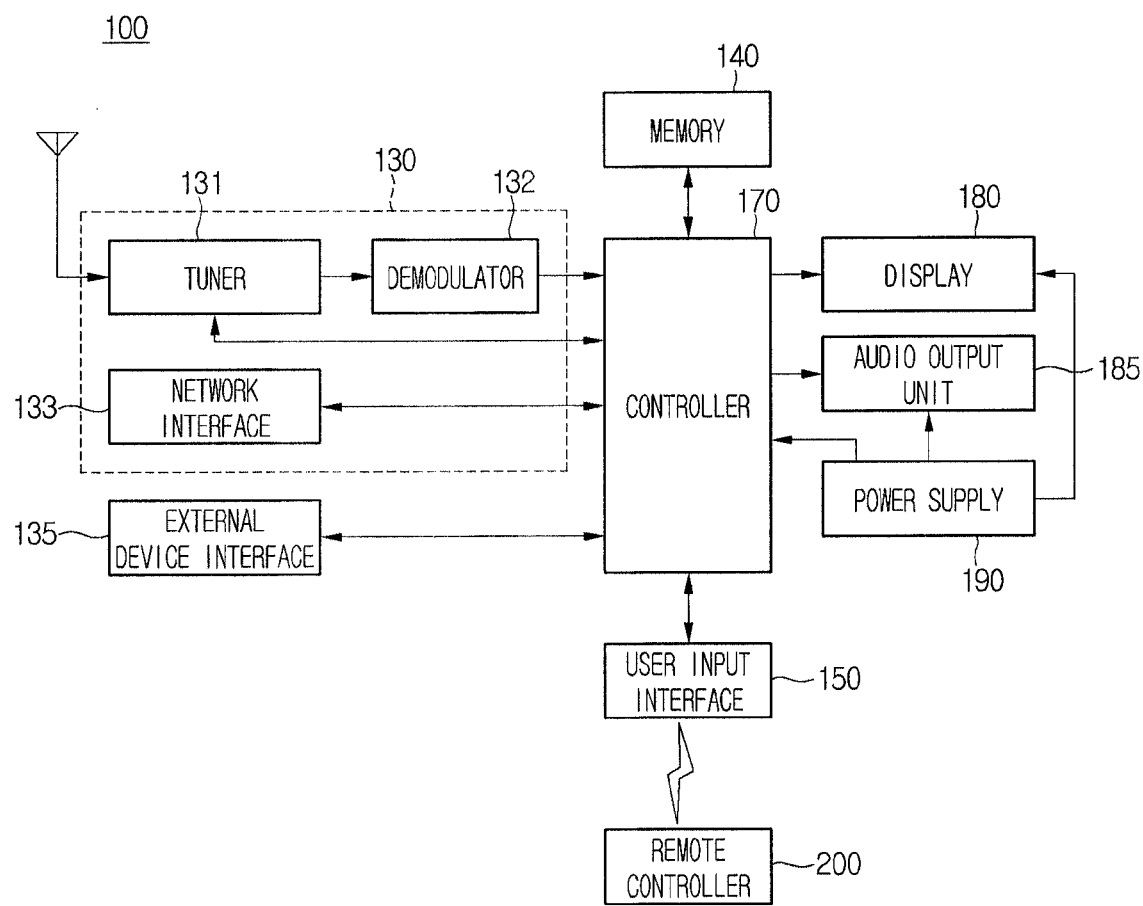
FIG. 5 is a block diagram illustrating a configuration of a video display device according to another embodiment of the present invention.

FIG. 5 is a block diagram illustrating a configuration of a video display device according to another embodiment of the present invention.

Referring to FIG. 5, the video display device 100 may include a broadcast receiving unit 130, an external device interface unit 135, a storage unit 140, a user input interface unit 150, a control unit 170, a display unit 180, an audio output unit 185, and a power supply unit 190. Moreover, the broadcast receiving unit 130 may include a tuner 131, a demodulation unit 132, and a network interface unit 133.

The tuner 131 may select an RF broadcast signal corresponding to the channel selected by a user or all pre-stored channels among the Radio Frequency broadcast signals received through an antenna, and may convert the selected RF broadcast signal into an intermediate frequency signal or a baseband video or an audio signal.

For example, when the selected RF broadcast signal is a digital broadcast signal, the tuner 131 converts the digital broadcast signal into a digital IF signal DIF and when it is an analog broadcast signal, converts it into an analog baseband video or an audio signal CVBS/SIF.

That is, the tuner 131 may process both a digital broadcast signal and an analog broadcast signal, and the analog baseband video or the audio signal CVBS/SIF outputted from the tuner 131 may be directly inputted to the control unit 170.

Additionally, the tuner 131 may receive a single carrier RF broadcast signal according to the Advanced Television System Committee (ATSC) format or a multiple carrier RF broadcast signal according to a Digital Video Broadcasting (DBV) format.

Moreover, the tuner 131 may sequentially select RF broadcast signals of all broadcast channels stored through a channel memory function among the Radio Frequency broadcast signals received through an antenna, and may convert the selected RF broadcast signals into an intermediate frequency signal or a baseband video, or an audio signal.

The demodulation unit 132 may perform a demodulation operation by receiving the digital IF signal DIF converted in the tuner 131. For example, when the digital IF signal outputted from the tuner 131 is the ATSC format, the demodulation unit 132 may perform 8-Vestigal Side Band (VSB) demodulation.

Additionally, the demodulation unit 132 may perform channel decoding and for this, may include a Trellis Decoder, a De-interleaver, and a Reed Solomon Decoder in order to perform Trellis decoding, de-interleaving, and Reed Solomon decoding.

For example, when the digital IF signal outputted from the tuner 131 is the DVB format, the demodulation unit 132 may perform Coded Orthogonal Frequency Division Modulation (COFDMA).

Additionally, the demodulation unit 132 may perform channel decoding and for this, may include a convolution decoder, a De-interleaver, and a Reed Solomon Decoder in order to perform convolution decoding, de-interleaving, and Reed Solomon decoding.

After performing the demodulation and channel decoding, the demodulation unit 132 may output a stream signal TS, and the stream signal may be a multiplexed signal including a video signal, an audio signal, or a data signal.

For example, the stream signal may be an MPEG-2 Transport Stream (TS) in which an MPEG-2 format video signal and a Dolby AC-3 format audio signal are multiplexed. Specifically, the MPEG-2 TS may include a 4 byte header and a 184 byte payload.

Moreover, the demodulation unit 132 may include an ATSC demodulation unit and a DVB demodulation unit separately according to the ATSC format and the DVB format.

The stream signal outputted from the demodulation unit 1323 may be inputted to the control unit 170. The control unit 170 outputs video to the display unit 180 and outputs audio to the audio output unit 185 after performing demultiplexing and image/voice signal processing.

The external device interface unit 135 may connect an external device and the video display device 100, and for this, may include an A/V input/output unit (not shown) or a wireless communication unit (not shown).

The external device interface unit 135 may be wire/wirelessly connected to an external device such as Digital Versatile Disk (DVD), Blu ray, game consoles, cameras, camcorders, and computers (notebooks).

Additionally, the external device interface unit 135 may deliver the video, audio or data signals inputted from an external through the connected external device to the control unit 170 of the video display device 100, and then, may output the video, audio, or data signals processed in the control unit 170 to the connected external device.

The A/V input/output unit may include a USB terminal, Composite Video Banking Sync (CVBS) terminal, a component terminal, an S-video terminal (analog), a Digital Visual Interface (DVI) terminal, a High Definition Multimedia Interface (HDMI) terminal, an RGB terminal, and a D-SUB terminal, in order to input video and audio signals of an external device to the video display device 100.

Moreover, the wireless communication unit may perform short-range wireless communication with another electronic device. For example, the video display device 100 may be connected to another electronic device via a network according to communication standards such as Bluetooth, Radio Frequency Identification (RFID), infrared Data Association (IrDA), Ultra Wideband (UWB), ZigBee, and Digital Living Network Alliance (DLNA).

Additionally, the external device interface unit 135 may be connected to various settop boxes through at least one of the above various terminals in order to perform an input/output operation with the settop box.

Moreover, the external device interface unit 135 may receive applications or application lists in an adjacent external device and then, may deliver them to the control unit 170 or the storage unit 140.

The network interface unit 133 may provide an interface for connecting the video display device 100 and a wired/wireless network including an internet network. For example, the network interface unit 133 may include an Ethernet terminal to access a wired network and may access a wireless network through communication standards such as Wireless LAN (WLAN) Wi-Fi, Wireless broadband (Wibro), World Interoperability for Microwave Access (Wimax), and High Speed Downlink Packet Access (HSDPA).

Moreover, the network interface unit 133 may transmit or receive data to or from another user or another electronic device through an accessed network or another network linked to the accessed network.

Additionally, some contents data stored in the video display device 100 may be transmitted to another user pre-registered to the video display device, or a selected user or electronic device among other users or electronic devices The network interface unit 133 may access a predetermined web page through an accessed network or another network linked to the accessed network. That is, by accessing the predetermined web page via a network, the network interface unit 133 may transmit or receive data to or from a corresponding server.

Then, the network interface unit 133 may receive contents or data that a CP or a network operator provides. That is, the network interface unit 133 may receive contents of movies, commercials, games, VOD, and broadcast signals, which are provided from a CP or an NP via a network, and information relating thereto.

Additionally, the network interface unit 133 may receive update information and update files of firmware that an NP provides, and may transmit data to an internet provider, a CP, or a network operator.

The network interface unit 133 may select and receive a desired application among open to air applications via a network.

The storage unit 140 may store programs for processing and controlling each signal in the control unit 170, and also may store the signal-processed video, sound, or data signals.

The storage unit 140 may perform a function for temporarily storing the video, audio, or data signals inputted from the external device interface unit 135 or the network interface unit 133, and also may store information on a predetermined broadcast channel through a channel memory function.

The storage unit 140 may store applications or application lists inputted from the external device interface unit 135 or the network interface unit 133.

The storage unit 140 may include at least one type of storage medium among a flash memory type, a hard disk type, a multimedia card micro type, a card type memory (for example, an SD or XD memory card), a RAM type, and a ROM type such as EEPROM.

The video display device 100 may play contents files stored in the storage unit 140 (such as movie files, still image files, music files, document files, and application files) and then may provide them to a user.

The user input interface unit 150 may deliver a signal that a user inputs to the control unit 170, or may deliver a signal from the control unit 170 to a user. For example, the user input interface unit 130 may receive a control signal such as power on/off, channel selection, and screen setting from the remote control device 200 and may process the received signal according to various communication methods such as a radio frequency (RF) communication method or an infrared (IR) communication method, or may transmit a control signal from the control unit 150 to the remote control device 200.

Moreover, the user input interface unit 150 may deliver to the control unit 150 a control signal inputted from a local key (not shown) such as a power key, a channel key, a volume key, and a setting value.

For example, the user input interface unit 130 may deliver a control signal, inputted from a sensing unit (not shown) for sensing a user's gesture, to the control unit 150, or may transmit a signal from the control unit 170 to a sensing unit (not shown). Moreover, the sensing unit (not shown) may include a touch sensor, a voice sensor, a position sensor, and a motion sensor.

The control unit 170 may demultiplex a stream inputted from the tuner 131, the demodulation unit 132, or the external device interface unit 135, or may process the demultiplexed signals in order to generate and output a signal for video or audio output.

An image signal image-processed in the control unit 170 may be inputted to the display unit 180 and then may be displayed as an image corresponding to a corresponding image signal. Additionally, an image signal image-processed in the control unit 170 may be inputted to an external output device through the external device interface unit 135.

An audio signal processed in the control unit 170 may be audio-outputted to the audio output unit 185. Additionally, an audio signal processed in the control unit 170 may be inputted to an external output device through the external device interface unit 135.

Although not shown in FIG. 5, the control unit 170 may include a demux and an image processing unit.

Other than that, the control unit 170 may control general operations of the video display device 100. For example, the control unit 170 may control the tuner 131 to tune an RF broadcast corresponding to a channel that a user selects or a pre-stored channel.

Additionally, the control unit 150 may control the video display device 100 according to a user command inputted through the user input interface unit 150 or an internal program, and may access a network to download application or an application list that a user wants into the video display device 100.

For example, the control unit 170 may control the tuner 131 to input a signal of a channel selected according to a predetermined channel selection command received through the user input interface unit 150, and may process the video, audio or data signals of the selected channel.

The control unit 170 may output the processed video or audio signal in addition to the channel information that a user selects through the display unit 180 or the audio output unit 185.

Additionally, the control unit 170 may output a video signal or an audio signal of an external device (for example, a camera or a camcorder), which is inputted through the external device interface unit 135, according to an external device video playback command received through the user input interface unit 150.

Moreover, the control unit 170 may control the display unit 160 in order to display an image, and for example, may control to display a broadcast video inputted through a tuner, an external input image inputted through an external device, an image inputted through the network interface unit 131, or an image stored in the storage unit 140, on the display unit 180. In this case, an image displayed on the display unit 180 may be a still image, a video, a 2D image, or a 3D image.

Additionally, the control unit 170 may control to play the contents stored in the video display device 100, the received broadcast contents, or the external input contents inputted from an external. The contents may be in various formats such as a broadcast video, an external input image, an audio file, a still image, an accessed web screen, and a document file.

The control unit 170 may control to display a home screen on the display unit 180 according to a move input for home screen.

The home screen may include a plurality of card objects classified by each contents source. The card object may include at least one content, and for example, there may be a card object representing a thumbnail list of a broadcast channel, a card object representing a broadcast guide list, a card object representing a broadcast reservation list or recording list, and a card object representing a media list in the video display device or in a device accessing the video display device. Additionally, a card object representing an accessed external device list and a card object representing a call related list may be further displayed on the home screen.

Additionally, the home screen may further include an application menu displaying at least one executable application item.

Moreover, if there is a card object move input, the control unit 170 may move and display a corresponding card object, or may move a card object not displayed on the display unit 180 and then may display it on the display unit 180.

When a predetermined card object is selected from a plurality of card objects in the home screen, the control unit 170 may control to display an image corresponding to a corresponding card object on the display unit 180.

The control unit 170 may display objects representing the received broadcast video and corresponding broadcast video related information in the card object representing a broadcast video. Then, such a broadcast video may be controlled to have a fixed size according to a lock setting.

Additionally, the control unit 170 may control to display a setup object on the home screen. The setup object is used for at least one setting of video setting in a video display device, audio setting, screen setting, reservation setting, pointer setting of a remote control device, and network setting. Also, the control unit 170 may control to display an object for login, help, or exit item on one area of the home screen.

Moreover, the control unit 170 may control to display the number of entire card objects in one are of the home screen or may control to display an object representing the number of card objects displayed on the display unit 180 among entire card objects.

When the card object name of a predetermined card object among a plurality of card objects displayed on the display unit 180 is selected, the control unit 170 may control to display a corresponding card object on the display unit 180 as a full screen.

When an incoming call is received in an accessed external device or a video display device, the control unit 170 focuses on and displays a call related card object among a plurality of card objects, or moves the call related card object in the display unit 180 and displays it.

Moreover, when entering into an application view item, the control unit 170 may control to display applications or application lists, which are downloadable from the video display device 100 or an external network.

The control unit 170 may control to install and run an application downloaded from an external network in addition to various user interfaces. Additionally, by a user's selection, an image relating to a running application may be controlled to be displayed on the display unit 180.

Additionally, although not shown in FIG. 5, the video display device 100 may further include a channel browsing processing unit for generating a thumbnail image corresponding to a channel signal or an external input signal.

The channel browsing processing unit may receive a stream signal TS outputted from the demodulation unit 132 or a stream signal outputted from the external device interface unit 135, and may extract an image from the inputted stream signal in order to a thumbnail image.

The generated thumbnail image may be inputted to the control unit 170 as it is or may be encoded and inputted to the control unit 170, or may be encoded in a stream format and then inputted to the control unit 170.

The control unit 170 may display a thumbnail list including a plurality of thumbnail images on the display unit 180 by using the inputted thumbnail image, and may sequentially or simultaneously update the thumbnail images in the thumbnail list. Accordingly, a user may conveniently recognize the contents of a plurality of broadcast channels.

The display unit 180 may convert an image signal, a data signal, and an OSD signal, which are processed in the control unit 170, or an image signal and a data signal, which are received from an external device, into R, G, and B signals in order to generate a driving signal.

For this, the display unit 180 may use a PDP, an LCD, an OLED, a flexible display, and a 3D display, or may include a touch screen in order to use it as an input device in addition to an output device.

The audio output unit 185 may receive a signal audio-processed in the control unit 170, for example, a stereo signal, a 3.1 channel signal, or a 5.1 channel signal, and may output it as audio. For this, various kinds of speakers may be used.

Moreover, the video display device 100 may further include a capturing unit (not shown) for capturing an image of a user, and image information obtained by the capturing unit (not shown) may be inputted to the control unit 170.

In this case, the control unit 170 may detect a user's gesture through an image captured by the capturing unit (not shown) and a signal sensed by the sensing unit (not shown) separately and a combination thereof.

The power supply unit 190 may supply corresponding power across the video display device 100, and for example, may supply power to the control unit 170, the display unit 180, and the audio output unit 185, which may be realized in a System On Chip (SOC) form.

For this, the power supply unit 190 may include a converter for converting AC power into DC power. When the display unit 180 is realized with a liquid crystal panel including a plurality of backlight lamps, the power supply unit 190 may further include an inverter (not shown) for PWM operation in order for a luminance change or a dimming drive.

The remote control device 200 transmits a user input to the user input interface unit 150. For this, the remote control device 200 may use a Bluetooth, RF communication, Ultra Wideband (UWB), or ZigBee type.

Additionally, the remote control device 200 may receive the video, audio, or data signals outputted from the user input interface unit 150 and then, may display them thereon or output them as sound or vibration.

The above video display device 100 as a fixed type may be a digital broadcaster receiver capable of receiving at least one of ATSC format (8-VSB format) digital broadcast, DVB-T format (COFDM format) digital broadcast, and ISDB-T format (BST-OFDM format) digital broadcast.

Moreover, the video display device 100 shown in FIG. 5 is just one example of the present invention. Therefore, some of the components shown may be integrated, added, or omitted according to the specifications of the actual realized video display device 100.

This is, if necessary, at least two components may be integrated into one component, or one component may be divided into at least two components and configured. Additionally a function performed in each block is to describe embodiments of the present invention, and thus, its specific operation or device does not limit the scope of the present invention.

According to another embodiment of the present invention, unlike FIG. 5, the video display device 100 may not in clued the tuner 131 and the demodulation unit 132, and may receive an image through the network interface unit 133 or the external device interface unit 135 and then may play it.

For example, the video display device 100 may be realized separately including an image processing device such as a settop box for receiving broadcast signals and contents according to various network services and a contents playing device for playing contents inputted from the image processing device.

In this case, a method of providing network service described later according to an embodiment of the present invention may be performed by the separated image processing device such as a settop or contents playing device including the display unit 180 and the audio output unit 185 in addition to the video display device 100 described with reference to FIG. 5

Figure 6:
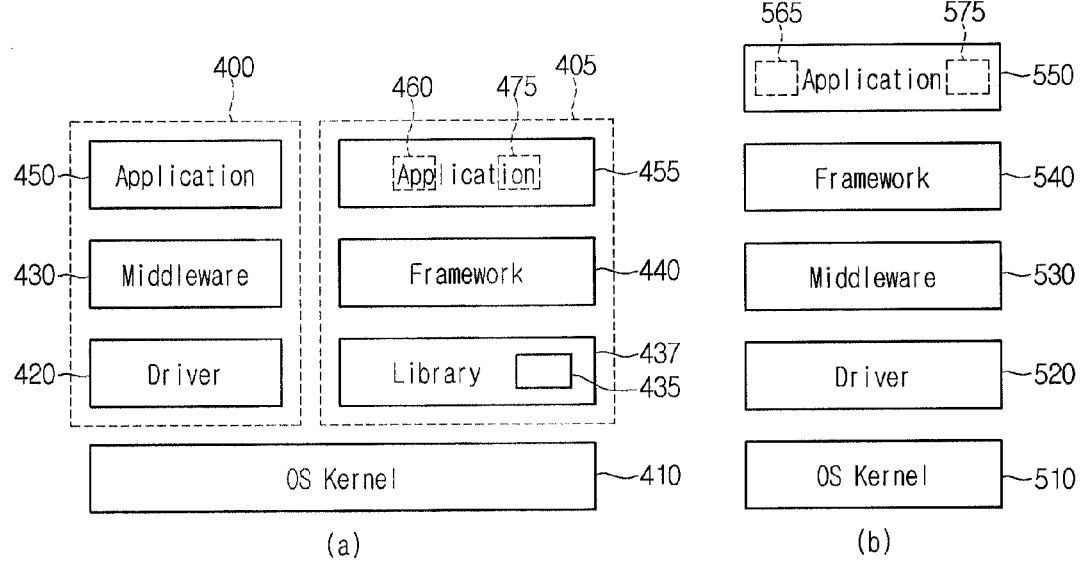
FIG. 6 is a view illustrating a platform structure of a video display device according to an embodiment of the present invention.

FIG. 6 is a view illustrating a platform structure of a video display device according to an embodiment of the present invention. The platform of the video display device 100 may have OS based software for performing the above-mentioned various operations.

Referring to FIG. 6(A), the platform of the video display device 100, as a separate platform, may include a separated and designed Legacy System platform 400 and smart system platform 405.

An OS kernel 410 may be commonly used in the legacy system platform 400 and the smart system platform 405, and the legacy system platform 400 may include a driver 420 on the OS kernel 410, a middleware 430, and an application layer 450.

Additionally, the smart system platform 405 may include a Library 435, a Framework 440, and an application layer 455 on the OS kernel 410.

The OS kernel 410, as the core of an operating system, may provide hardware driver driving while the video display device 100 is driven, security of hardware and a processor in the video display device 100, efficient management of a system resource, memory management, interface provision for hardware by hardware abstraction, a multiprocessor, schedule management according to a multiprocessor, and power management.

For example, the hardware driver in the OS kernel 410 may include at least one of a display driver, a Wi-Fi driver, a Bluetooth driver, a USB driver, an audio driver, a power management, a binder driver, and a memory driver.

Additionally, the hardware driver in the OS kernel 410, as a driver for hardware device in the OS kernel 410, may include a character device driver, a block device driver, and a network device driver.

Moreover, the block device driver may include a buffer for storing as much as a unit size as data are transmitted by a specific block unit. The character device driver may not include the buffer as a basic data unit, i.e. a character unit, is transmitted.

The OS kernel 410 may be realized with various Operating System (OS) based (for example, UNIX based (Linux) and Window based) kernels and may be available on other electronic devices as an open OS kernel.

The driver 420 is positioned between the OS kernel 410 and the middleware 430, and may drive a device in order for an operation of the application layer 450 in addition to the middleware 430.

For example, the driver 420 may include a driver for a micom, a display module, a graphic processing unit (GPU), a Frame Rate Converter (FRC), a General Purpose Input/Output Pin (GPIO), an HDMI, an SDEC (such as a System Decoder or a demux), a Video Decoder (ADEC), an Audio Decoder (ADEC), a Personal Video Recorder (PVR), or an Inter-Integrated Circuit (I2C) in the video display device 100. The drivers may operate in linkage with the hardware driver in the OS kernel 410.

Additionally, the driver 420 may further include a driver for the remote control device 200, for example, a spatial remote controller, and the driver for the spatial remote controller may be diversely included in the OS kernel 410 or the middleware 430 in addition to the driver 420.

The middleware 430 is positioned between the OS kernel 410 and the application layer 450, and may serve as a medium role to exchange data between another hardware and software. Also, a standardized interface according thereto may be available; various environments may be provided; and a mutual linkage with another task having a different system may be possible.

For example, the middleware 430 in the legacy system platform 400 may include middleware of Multimedia and Hypermedia information coding Experts Group (MHEG) and Advanced Common Application Platform (ACAP), i.e. data broadcast related middleware, and also PSIP or SI middleware, i.e. broadcast information related middleware, and DLNA middleware, i.e. peripheral device communication related middleware.

Moreover, the application layer 450 on the middleware, i.e. the application layer 450 in the legacy system platform 400, may include a User Interface Application relating to various menus in the video display device 100.

The application layer 450 on the middleware 430 may be edited by a user's selection and may be updated via a network. By using such the application layer 450, a user may enter a desired menu among various user interfaces according to an input of a remote control device while watching a broadcast video.

Additionally, the application layer 450 in the legacy system platform 400 may further include at least one of a TV guide application, a Bluetooth application, a reservation application, a Digital Video Recorder (DVR) application, and a hotkey application.

Additionally, the library 435 in the smart system platform 405 may be positioned between the OS kernel 410 and the framework 440, and may form the basis of the framework 440. For example, the library 435 may include a Secure Socket Layer (SSL) (i.e. a security related library), a WebKit (i.e. a web engine related library), a libc (i.e. a c library), and a Media Framework (i.e. a media related library such as a video format and an audio format). The library may be programmed based on C or C++ so that it may be exposed to a developer through the framework 440.

The library 435 may include a runtime 437 having a core java library and a Virtual Machine (VM), and the runtime 437 may form the basis of the framework 440 together with the library 435.

The VM may perform a plurality of instances, i.e. multitasking. Moreover, each VM may be allocated and executed according to each application in the application layer 455, and in this case, a binder driver (not shown) in the OS kernel 410 may operate in order for schedule adjustment or interconnect between a plurality of instances.

Moreover, the binder driver and the runtime 437 may connect a java based application and a C based library, and the library 435 and the runtime 437 may correspond to the middleware of a legacy system.

Moreover, the framework 440 in the smart system platform 405 includes a program, which is the basis of an application in the application layer 455. The framework 440 is compatible with any application and the reuse, transfer, or exchange of a component is possible.

The framework 440 may include a support program and a program binding other software components, and for example, may include a resource manager, an activity manager relating to the activity of an application, a notification manager, and a content provider summarizing sharing information between applications.

The application layer 455 on the framework 440 includes various programs driven in and displayable on the video display device 100, and for example, may include a core application consisting of email, short message service (SMS), a calendar, a map, and a browser.

Moreover, the above framework 440 or the application layer 450 may be programmed based on JAVA.

Additionally, the application layer 455 may include an application 465 built in the video display device 100 and cannot be deleted by a user and an application 475 downloaded through an external device or a network and can be freely installed or deleted.

Through an application in the application layer 455, Internet phone service via network access, VOD service, web album service, SNS, Location Based Service (LBS), map service, web search service, and application search service may be performed. Additionally, various functions such as gaming and scheduling may be performed.

Additionally, as shown in FIG. 6(B), the platform of the video display device 100, as an integrated platform, may include an OS kernel 510, a driver 520, a middleware 530, a Framework 540, and an application layer 550.

Compared to FIG. 6(A), there are differences in the platform of FIG. 6(B), in that the library 435 is omitted and the application layer 550 is provided as an integrated layer. Besides those, the driver 520 and the framework 540 may be identical.

The platforms shown in FIG. 6(A) and FIG. 6(B) may be generally used in various electronic devices in addition to the video display device 100, and may be stored or loaded in the storage 140 or the control unit 170 shown in FIG. 5 or a separate processor (not shown).

Additionally, the platform may be stored or loaded in the SI&metadata DB 711, the UI manager 714, or the service manager 713 shown in FIG. 4, and may further include a separate application processor (not shown) for executing the application.

Figure 7:
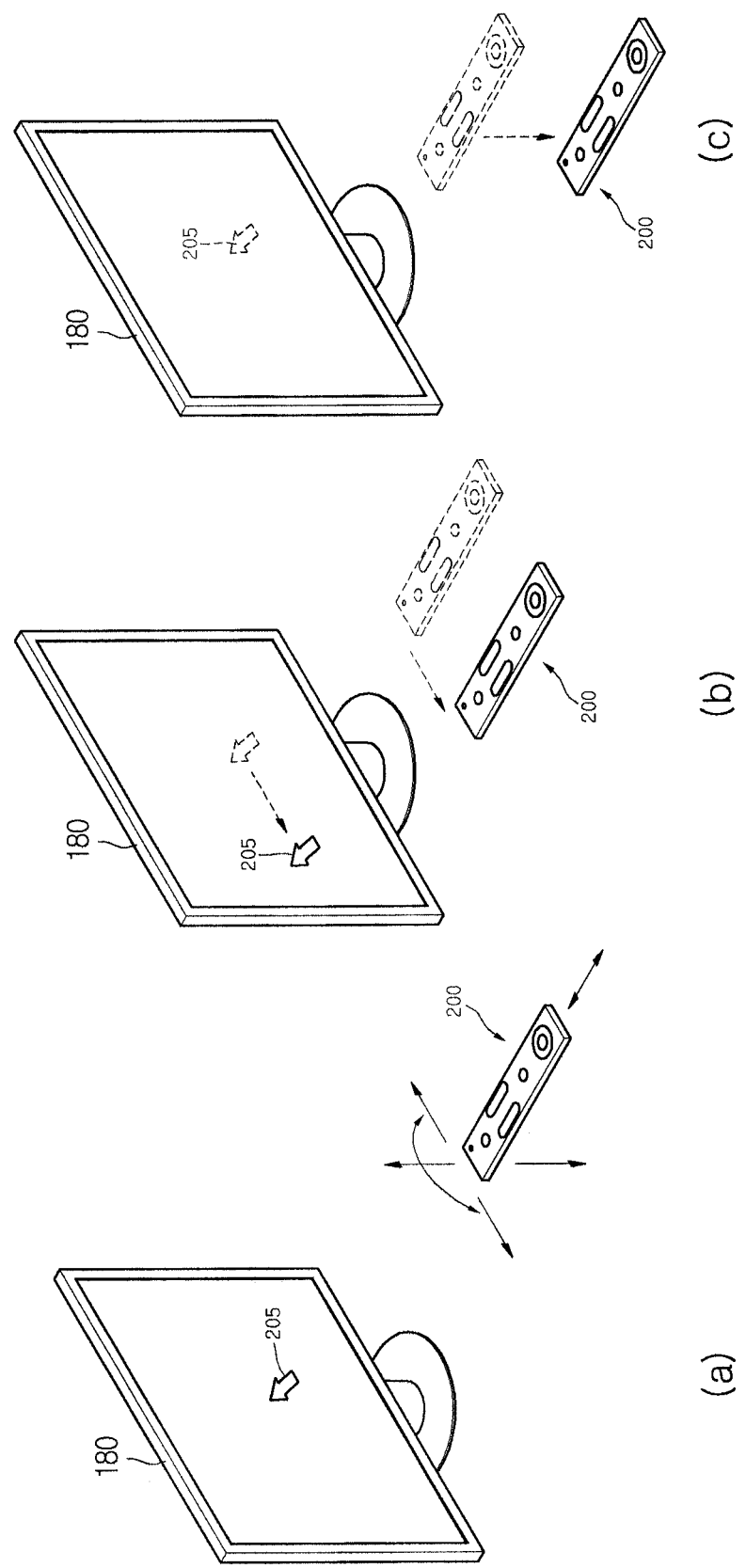
FIG. 7 is a view illustrating a method of controlling an operation of a video display device by using a remote control device according to an embodiment of the present invention.

FIG. 7 is a view illustrating a method of controlling an operation of a video display device by using a remote control device according to an embodiment of the present invention.

As shown in FIG. 7(A), a pointer 205 corresponding to the remote control device 200 is displayed on a display unit 180.

A user may move the remote control device 200 up and down, left and right, and back and forth or may rotate it. The pointer 205 displayed on the display unit 180 of the video display device corresponds to the movement of the remote control device 200. As such the remote control device 200, as shown in the drawing, moves on a 3D space, the corresponding pointer 205 moves and is displayed according thereto. Therefore, the remote control device 200 may be called a spatial remote controller.

As shown in FIG. 7(B), when a user moves the remote control device 200 to the left, a pointer 205 displayed on the display unit 180 of the video display device moves to the left in correspondence thereto.

Information on the movement of the remote control device 200 sensed by the sensor of the remote control device 200 is transmitted to the video display device. The video display device may calculate the coordinates of the pointer 205 from the information on the movement of the remote control device 200. The video display device may display the pointer 205 in order to correspond to the calculated coordinates.

FIG. 7(C) illustrates a view when a user moves the remote control device 200 farther away from the display unit 180 while pressing a specific button of the remote control device 200. By doing so, a selected area in the display unit 180 corresponding to the pointer 205 is zoomed in so that it is enlarged and displayed.

On the contrary, when a user moves the remote control device 200 closer to the display unit 180, a selected area in the display unit 180 corresponding to the pointer 205 is zoomed out so that it is reduced and displayed.

Moreover, when the remote control device 200 becomes farther away from the display unit 180, a selected area may be zoomed out and when the remote control device 200 becomes closer to the display unit 180, a selected area may be zoomed in.

Additionally, while a specific button in the remote control device 200 is pressed, the up and down and left and right movements may not be recognized. That is, when the remote control device 200 moves farther away from or closer to the display unit 180, the up and down and left and right movements may not be recognized and only the back and forth movements may be recognized. While a specific button in the remote control device 200 is not pressed, according to the up and down and left and right movements of the remote control device 200, on the pointer 205 moves.

Moreover, the moving speed or moving direction of the pointer 205 may correspond to that of the remote control device 200.

Moreover, a pointer in this specification means an object displayed on the display unit 180 in correspondence to an operation of the remote control device 200. Accordingly, various forms of objects are possible in addition to the arrow form shown as the pointer 205 in the drawing. For example, the object may have a dot, prompt, or thick outline form. Also, the pointer 205 may be displayed in correspondence to the one point of the horizontal axis and the vertical axis on the display unit 108, and also may be displayed in correspondence to a plurality of points such as a line and a surface.

Figure 8:
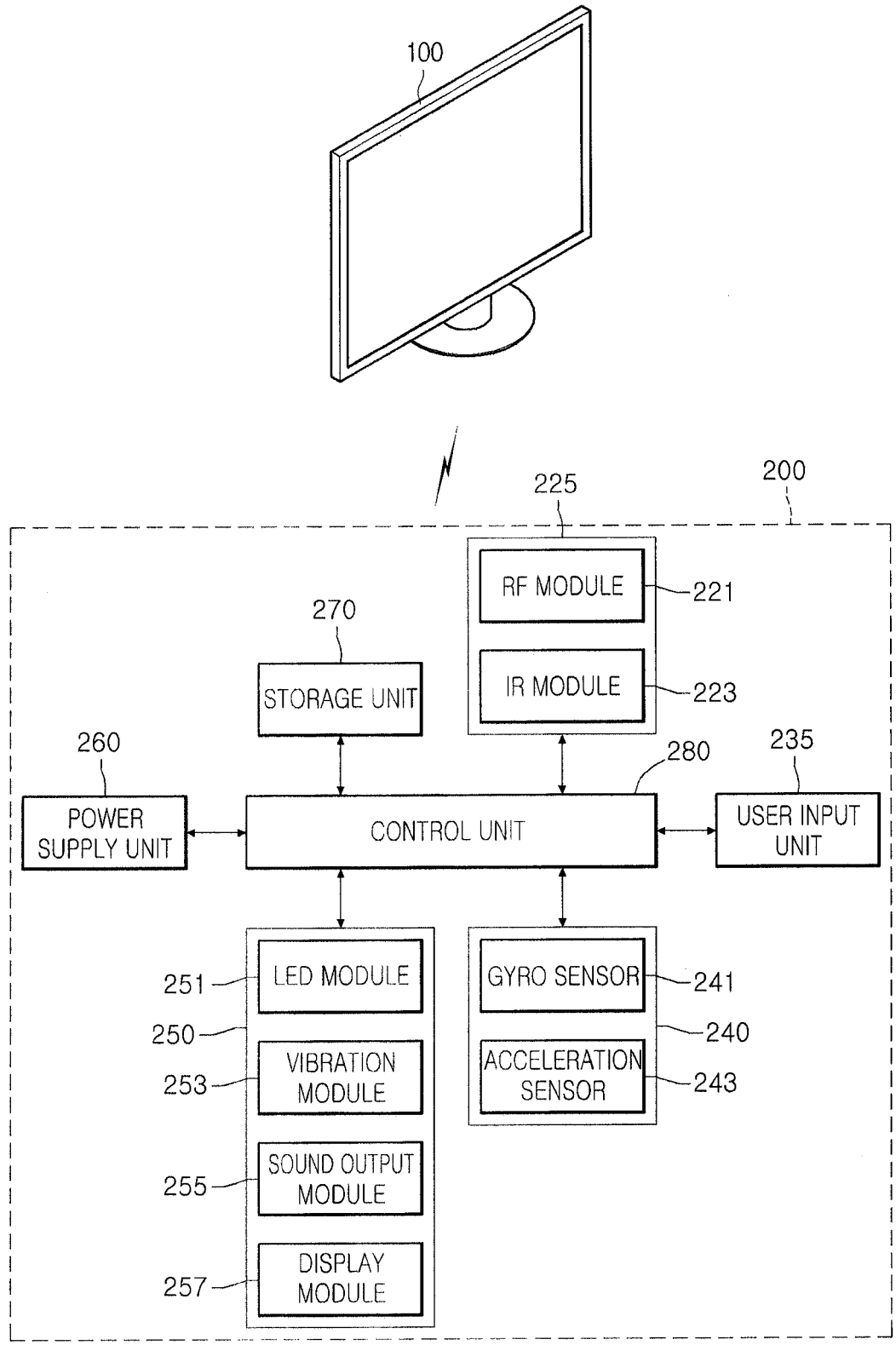
FIG. 8 is a block diagram illustrating a configuration of a remote control device according to an embodiment of the present invention.

FIG. 8 is a block diagram illustrating a configuration of a remote control device. The remote control device 200 may include a wireless communication unit 225, a user input unit 235, a sensing unit 240, an output unit 250, a power supply unit 260, a storage unit 270, and a control unit 280.

Referring to FIG. 8, the wireless communication unit 225 may transmit/receive a signal to/from arbitrary one of video display device s according to embodiments of the present invention.

The remote control device 200 may include an RF module 221 for transmitting/receiving a signal to/from the video display device 100 according to an RF communication standard and an IR module 223 for transmitting/receiving a signal to/from the video display device 100 according to an IR communication standard.

Additionally, the remote control device 200 may transmit a signal containing information on the movement of the remote control device 200 to the video display device 100 through the RF module 221.

Moreover, the remote control device 200 may receive a signal that the video display device 100 transmits through the RF module 221. If necessary, the remote control device 200 may transmit a command on power on/off, channel change, and volume change to the video display device 100 through the IR module 223.

The user input unit 235 may include a keypad, a button, a touch pad, or a touch screen. A user may manipulate the user input unit 235, and then may input a command relating to the video display device 100 into the remote control device 200. When the user input unit 235 includes a hard key button, a user may input a command relating to the video display device 100 into the remote control device 200 through a push operation of the hard key button.

When the user input unit 235 includes a touch screen, a user may input a command relating to the video display device 100 into the remote control device 200 by touching a soft key of the touch screen. Additionally, the user input unit 235 may include various kinds of input means that a user can manipulate such as a scroll key or a jog key, and this embodiment does not limit the scope of the present invention.

The sensing unit 240 may include a gyro sensor 241 or an acceleration sensor 243. The gyro sensor 241 may sense information on the movement of the remote control device 200.

For example, the gyro sensor 241 may sense information on the movement of the remote control device 200 on the basis of x, y, and z axes, and the acceleration sensor 243 may sense information on the moving speed of the remote control device 200. Moreover, the remote control device 200 may further include a distance measuring sensor, so that it may sense the distance from the display unit 180 of the video display device 100.

The output unit 250 may output a video or audio signal corresponding to the manipulation of the user input unit 235 or a signal transmitted from the video display device 100. A user may recognize whether the user input unit 235 is manipulated or whether the video display device 100 is controlled, through the output unit 250.

For example, the output unit 250 may include an LED module 251 for emitting light, a vibration module 253 for generating vibration, a sound output module 255 for outputting sound, or a display module 257 for outputting an image, when the user input unit 235 is manipulated or a signal is transmitted to or received from the video display device 100 through the wireless communication unit 225.

Additionally, the power supply unit 260 supplies power to the remote control device 200, and cuts off power when the remote control device 200 does not move for a predetermined time, so that power may be saved. The power supply unit 260 may resume power supply when a predetermined key in the remote control device 200 is manipulated.

The storage unit 270 may store various kinds of programs and applications necessary for controls or operations of the remote control device 200. If the remote control device 200 may wirelessly transmit/receive a signal to/from the video display device 100 through the RF module 221, the remote control device 200 and the video display device 100 transmits/receives a signal through a predetermined frequency band.

The control unit 280 of the remote control device 200 may store information on a frequency band (through which a signal is wirelessly transmitted to or received from the video display device 100 paired with the remote control device 200) in the storage unit 270 and then may refer to it later.

The control unit 280 controls all the matters relating to a control of the remote control device 200. The control unit 280 may transmit to the video display device 100 a signal corresponding to a predetermined key manipulation of the user input unit 235 or a signal corresponding to the movement of the remote control device 200 sensed by the sensing unit 240, through the wireless communication unit 235.

Figure 9:
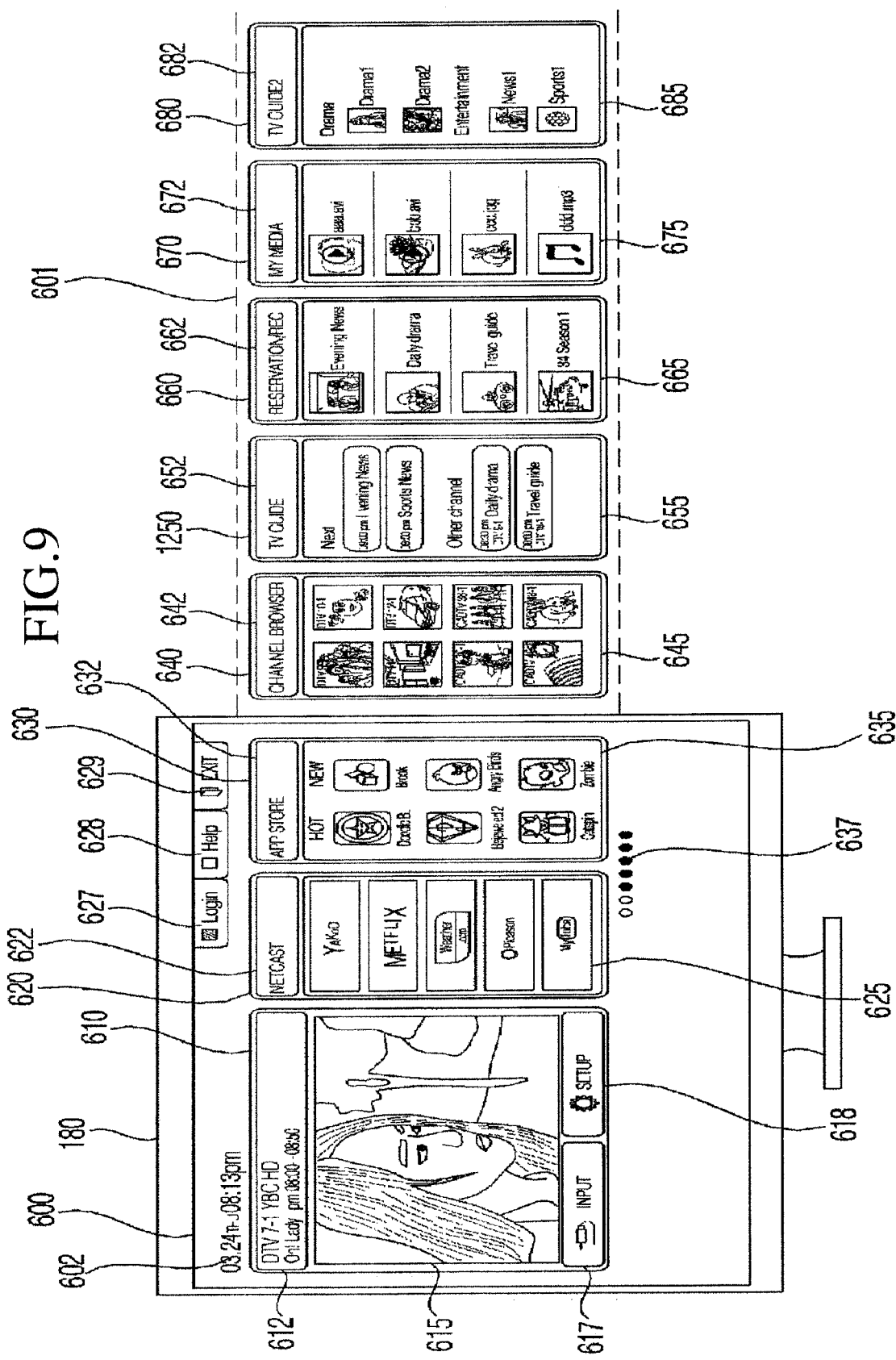
FIG. 9 is a view illustrating a configuration of a home screen displayed on a video display device according to an embodiment of the present invention.

FIG. 9 is a view illustrating a configuration of a home screen displayed on a video display device according to an embodiment of the present invention.

The home screen configuration shown in FIG. 9 may be one example of a basic screen configuration of the video display device 100, and this screen may be set as an initial screen when power is on or power is on after a standby mode, or an initial screen due to an operation of a home key in the remote control device 200.

Referring to FIG. 9, the home screen 600 may include a card object area, and the card object area may include a plurality of card objects 610, 620, and 630, which are classified by a contents source.

In the drawing, a card object BROADCAST 610 representing a broadcast video, a card object NETCAST 620 representing a CP list, and a card object APP STORE representing an application providing list are displayed on the display unit 180.

Moreover, the card object APP STORE 630 representing an application providing list may include information on a plurality of applications downloadable from the SP 20, and for example, may include a plurality of icons corresponding to the applications respectively.

Additionally, in the drawing, as a card object not shown in the display unit 180 but displayed in a hidden area 601 and replaced and displayed when a card object moves, there are a card object CHANNEL BROWSER 640 representing a thumbnail list of broadcast channels, a card object TV GUIDE 650 representing a broadcast guide list, a card object RESERVATION/REC 650 representing a broadcast reservation list or a recording list, a card object MY MEDIA 670 representing a media list in a video display device or a device accessing a video display device, and a card object TV GUIDE2 680 representing a broadcast guide list.

The card object BROADCAST 610 representing a broadcast video may include a broadcast video 615 received through the tuner 110 or the network interface unit 130, an object 612 representing corresponding broadcast video related information, an object 617 representing an external device, and a setup object 618.

The broadcast video 615 may be displayed as a card object and may have a fixed size by a locking function, so that a user may continuously watch a broadcast video.

The broadcast video 615 may have a variable size by a user's manipulation. For example, through drag using the pointer 205 of the remote control device 200, the size of the corresponding broadcast video 615 may be enlarged or reduced. By such an enlargement or reduction, the number of card objects displayed on the display unit 180 may be two or four instead of 3 shown in the drawing.

Moreover, when the broadcast video 615 in the card object is selected, a corresponding broadcast video may be displayed on the display unit 180 as a full screen.

The object 612 representing corresponding broadcast video related information may include a channel number (DTV7-1), a channel name (YBC HD), a broadcast program name (Oh! Lady), and a broadcasting time (pm 08:00~08:50). By doing so, a user may intuitively recognize information on the displayed broadcast video 615.

When the object 612 representing corresponding broadcast video related information is selected, related EPG information may be displayed on the display unit 180.

Moreover, an object representing a date (03.24), a day (THU), and a current time (pm 08:13) may be displayed on the card object 610 representing a broadcast video. By doing so, a user may intuitively recognize time information.

The object 617 representing an external device may represent an external device accessing the video display device 100. For example, when the object 617 is selected, a list of external devices accessing the video display device 100 may be displayed.

The setup object 618 may be used for inputting various settings of the video display device 100. For example, various setting such as video setting, audio setting, screen setting, reservation setting, pointer setting of the remote control device 200, and network setting may be performed.

Moreover, the card object 620 representing a CP list may include a card object name NETCAST 622 and a contents provider list 625. In the drawing, Yakoo, Metflix, weather.com, Picason, and My tube are displayed as contents providers in the contents provider list 625, but various settings are possible.

When the card object name 622 is selected, the corresponding card object 620 may be displayed on the display unit 180 as a full screen.

Moreover, when a predetermined contents provider in the contents provider list 625 is selected, a screen including a contents list that a corresponding contents provider provides may be displayed on the display unit 180.

The card object 630 representing an application providing list may include a card object name APP STORE 632 and an application list 635. The application list 635 may be a list where applications in an application store are classified and aligned by each item. In the drawing, the applications are aligned and displayed by the popularity HOT and the latest New, but the present invention is not limited thereto. That is, various examples are possible.

When the card object name 632 is selected, the corresponding card object 630 may be displayed on the display unit 180 as a full screen.

Moreover, when a predetermined application item in the application list 635 is selected, a screen providing information on a corresponding application may be displayed on the display unit 180.

A login item 627, a help item 628, and an exit item 629 may be displayed at the tops of the card objects 620 and 630.

The login item 627 may be used for logging in an app store or a network that a video display device accesses. The help item 628 may be used for help during an operation of the video display device 100. The exit item 629 may be used for exiting a corresponding home screen. At this point, a received broadcast video may be displayed as a full screen.

An object 637 representing the number of entire card objects may be displayed at the bottoms of the card objects 620 and 630. The object may represent the number of card objects displayed on the display unit 180 among entire card objects in addition to the number of entire card objects.

Moreover, the card object 640 representing a thumbnail list of broadcast channels may include a card object name CHANNEL BROWSER 642 and a thumbnail list 645 of broadcast channels. In the drawing, sequentially-received broadcast channels are displayed as thumbnail images but the present invention is not limited thereto. That is, videos are also possible. The thumbnail list may include thumbnail images and channel information on a corresponding channel. By doing so, a user may intuitively recognize the contents of a corresponding channel.

Such a thumbnail image may be a thumbnail image for a favorite channel that a user pre-registers, or a thumbnail image for a channel after or before the broadcast video 615 in the card object 610. Moreover, eight thumbnail images are exemplarily shown in the drawing, but various settings are possible. Additionally, the thumbnail images in the thumbnail list may be updated.

When the card object name 642 is selected, the corresponding card object 640 may be displayed on the display unit 180 as a full screen. That is, the contents on the thumbnail list may be displayed on the display unit 180.

Moreover, when a predetermined thumbnail image in the thumbnail list 645 of broadcast channels is selected, a broadcast video corresponding to a corresponding thumbnail image may be displayed on the display unit 180.

The card object 650 representing a broadcast guide list may include a card object name TV GUIDE 652 and a broadcast guide list 655. The broadcast guide list 655 may be a list for broadcast programs after the broadcast video 615 in the card object 610 or broadcast video s of another channel, but is not limited thereto. That is, various examples are possible.

Moreover, when the card object name 652 is selected, the corresponding card object 650 may be displayed on the display unit 180 as a full screen.

Moreover, when a predetermined broadcast item in the broadcast guide list 655 is selected, a broadcast video corresponding to a corresponding broadcast item may be displayed on the display unit 180 or broadcast information corresponding to a corresponding broadcast item may be displayed on the display unit 180.

The card object 660 representing a broadcast reservation list or a recording list may include a card object name RESERVATION/REC 662 and a broadcast reservation list or recording list 665. The broadcast reservation list or recording list 665 may be a list including broadcast items that a user sets for reservation or broadcast items recorded according thereto. In the drawing, a thumbnail image is displayed for each corresponding item as one example, but various examples are possible.

Moreover, when the card object name 662 is selected, the corresponding card object 660 may be displayed on the display unit 180 as a full screen.

Moreover, when a pre-reserved broadcast item or a recorded broadcast item in the broadcast reservation list or recording list 665 is selected, broadcast information on a corresponding broadcast or a recorded broadcast video may be displayed on the display unit 180.

The card object 670 representing a media list may include a card object name MY MEDIA 672 and a media list 675. The media list 675 may be a media list in the video display device 100 or in a device accessing the video display device 100. In the drawing, video, a still image, and audio are exemplarily shown, but besides those, various examples such as text documents and e-book documents are possible.

Moreover, when the card object name 672 is selected, the corresponding card object 670 may be displayed on the display unit 180 as a full screen.

Moreover, when a predetermined media item in the media list 675 is selected, a screen providing information on corresponding media may be displayed on the display unit 180.

The card object TV GUIDE2 680 representing a broadcast guide list may include a card object name TV GUIDE2 682 and a broadcast guide list 685. The broadcast guide list 685 may be a guide list for each broadcast type. In the drawing, a list for broadcast types is exemplarily displayed by classifying with drama, news, or entertainment such as sports, but various setting are possible. That is, the list for broadcast types is a broadcast guide list for types such as drama, movie, news, sports, and animation. By doing so, a user may confirm a guide list classifying broadcasts by genre.

When the card object name 682 is selected, the corresponding card object 680 may be displayed on the display unit 180 as a full screen.

Moreover, when a predetermined broadcast item in the broadcast guide list 685 is selected, a screen corresponding to a corresponding broadcast video may be displayed on the display unit 180.

The card objects 620 and 630 displayed on the display unit 180 and the card objects 640, 650, 660, 670, and 680 not displayed on the display unit 180 and positioned in a hidden area 601 may be replaced with each other through an input for moving a card object.

That is, at least one of the card objects 620 and 630 may move to the hidden area 601, and at least one of the card objects 640, 650, 660, 670, and 680 may be displayed on the display unit 180.

Moreover, the home screen 600 of the video display device 100 may further include a card object representing software upgrade related information.

According to an embodiment of the present invention, the video display device 100 includes a web browser application installed to display a specific web page on a screen through web browsing, and when the web browser application is selected, a plurality of thumbnail images respectively corresponding to a plurality of web pages are displayed on the screen, so that a corresponding web page is displayed according to the selection of the thumbnail image.

Figure 10:
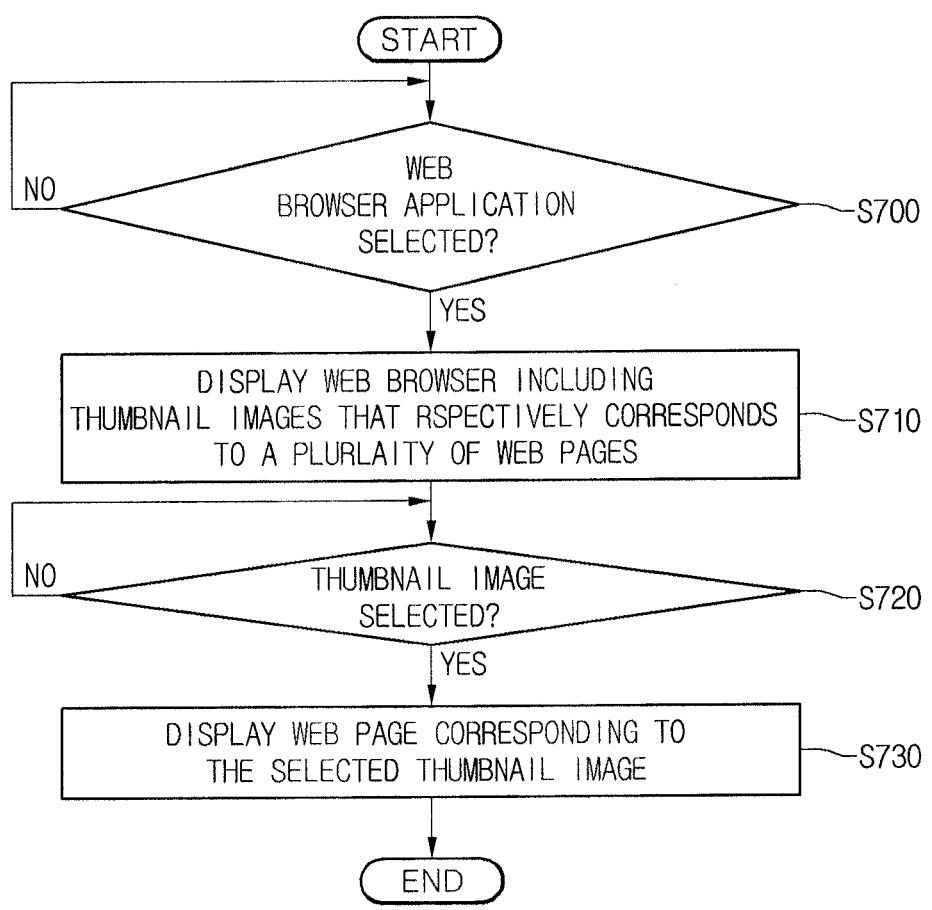
FIG. 10 is a flowchart illustrating a web browsing method of a video display device according to an embodiment of the present invention.

FIG. 10 is a flowchart illustrating a web browsing method of a video display device according to an embodiment of the present invention. The shown control method will be described in association with the block diagram illustrating the video display device of FIG. 5.

Referring to FIG. 10, the user interface unit 150 of the video display device 100 receives a selection on a web browser application from a user in operation S700, and displays on a screen a web browser including thumbnail images that respectively corresponding to a plurality of web pages in response to the selected web browser application in operation S710.

Figure 11:
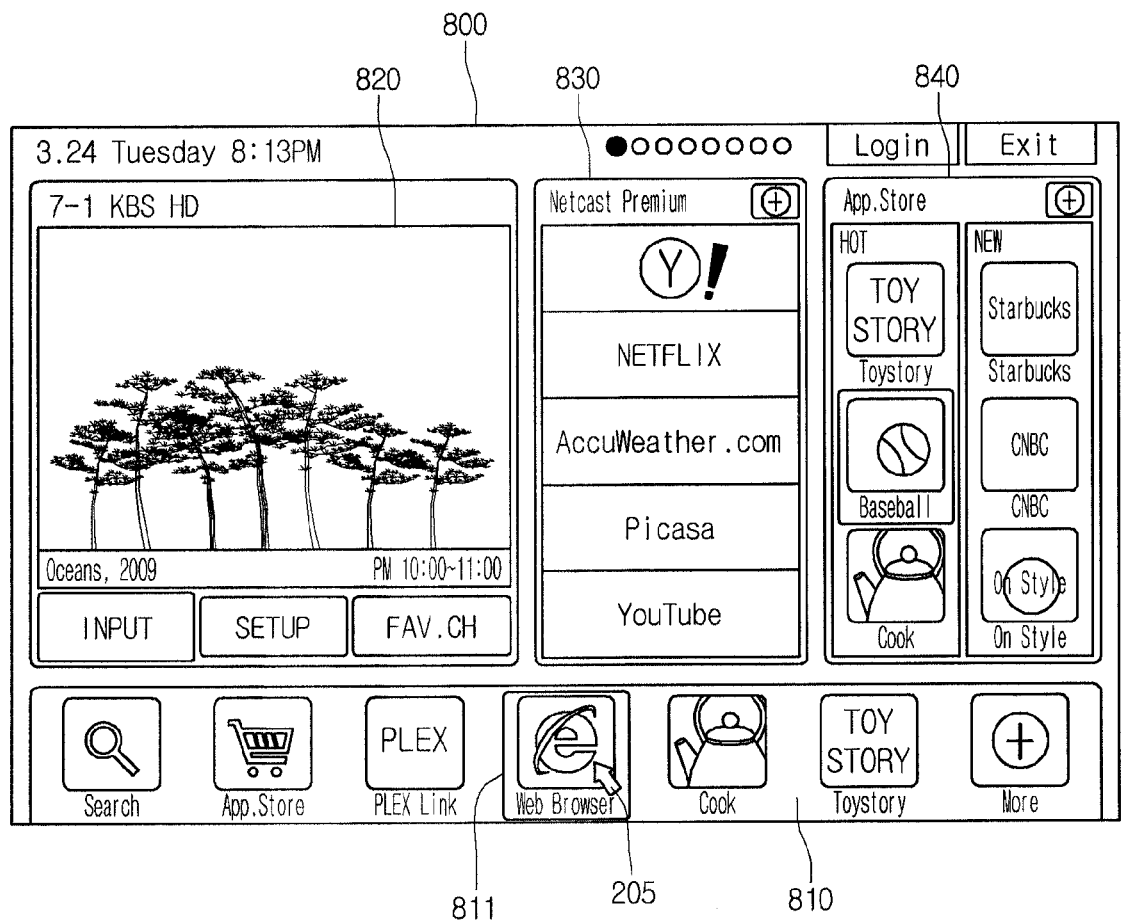
FIGS. 11 to 13 are views illustrating a method of displaying a web browser in a video display device according to an embodiment of the present invention.

Referring to FIG. 11, the display unit 180 may display an application menu 810 on the screen 800, which is an object representing application items installed in the video display device 100.

For example, the application menu 810 may include icons respectively corresponding to a plurality of applications downloaded using the "App. Store" object 840 and executable in the video display device 100.

Additionally, the application items displayed in the application menu 810 may be edited to represent frequently-used applications by a user's setting.

According to an embodiment of the present invention, the application menu 810 may include a web browser icon 811 corresponding to a web browser application, which allows a web page to be displayed on a screen through web browsing.

The display unit 180 may display at least one object on the screen 800 together with the application menu 810. The at least one object may represent at least one of a broadcast video and contents provider list, a purchase available application list, a broadcast channel list, a broadcast guide list, a broadcast reservation/recording list, a media list, an external device list, a call related list, and a list of contents provided from a specific contents provider.

For example, the display unit 180 may display a broadcast video display window 820, i.e. an object for displaying a broadcast video, together with the application menu. The broadcast video display window 820 may include a broadcast video 822 received through the tuner 110 or the network interface unit 135.

Moreover, the display unit 180 may display various objects on the screen in addition to the application menu 810 and the broadcast video display window 820. For example, as shown in FIG. 11, the display unit 180 may display the "Netcast Premium" object 830 representing a plurality of preset CPs and the "App. Store" object 840 representing downloadable applications.

In operation S700, a user may move the pointer 205 displayed on the screen 800 by using the remote control device 200 to select a web browser icon 830 in the application menu 810. By doing so, the user may request the execution of the web browser application.

Or, the user may select the web browser icon 830 in the application menu 810 by using the up, down, left, and right navigation keys equipped in the remote control device 200.

Figure 12:
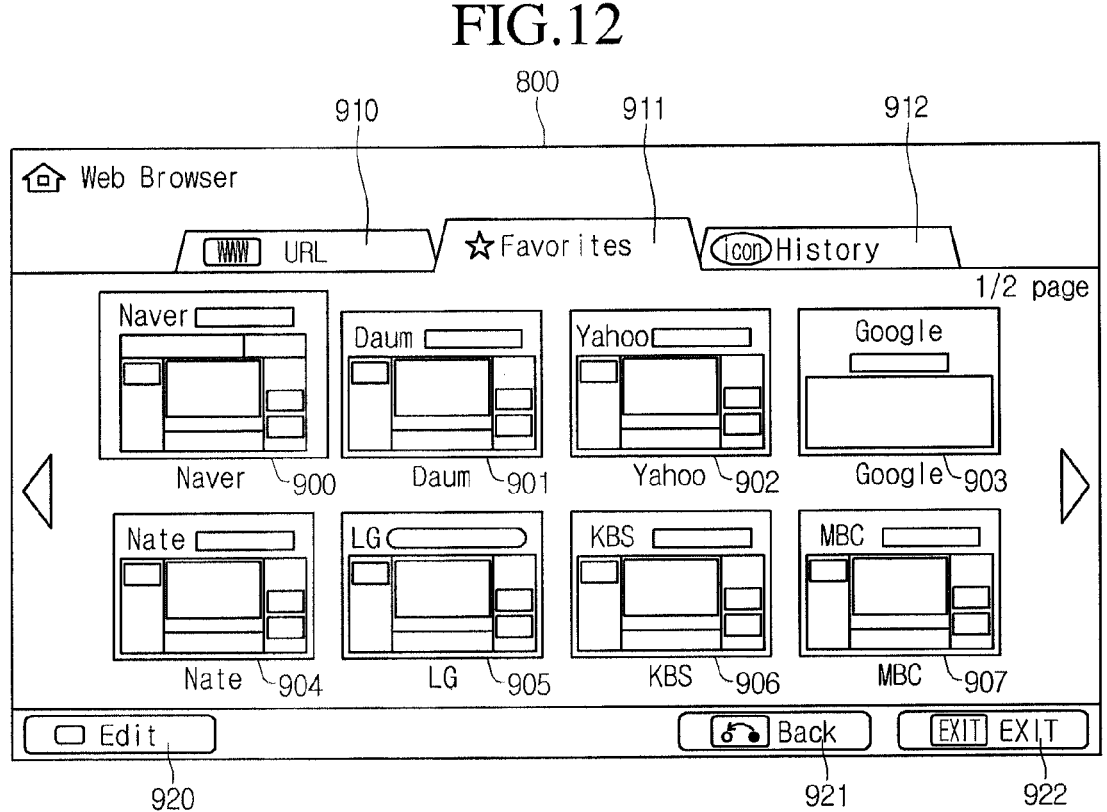

When the user selects the web browser application, as shown in FIG. 12, a web browser including a plurality of thumbnail images 900 to 907 may be displayed on the screen 800.

The plurality of thumbnail images 900 to 907 may respectively correspond to a plurality of web pages, and the plurality of web pages may be pre-registered by a user's request.

Additionally, the thumbnail images 900 to 907 may represent a screen for each corresponding web page displayed, and may be an image generated by capturing a screen of a corresponding web page displayed.

The generated thumbnail image may be stored in the storage unit 140 in correspondence to a corresponding web page.

Moreover, the web browser displayed on the screen 800 may include option items such as a "URL" item 910, a "Favorites" item 911, and a "History" item 912.

For example, when a user selects the web browser application, since the "Favorites" item 911 is set by default, as shown in FIG. 12, the thumbnail images 900 to 907 corresponding to a plurality of web pages are displayed.

Moreover, a user may select the "URL" item 910 in order to directly input the URL of a web page that the user wants to access, and may select the "History" item 912 in order to confirm history information on previously accessed web pages.

Additionally, web browser related menu buttons, for example, an "Edit" button 920 for editing, a "back" button 921 for returning to a previous screen state, and an "EXIT" button 922 for terminating the display of a web browser may be displayed at the bottom of the screen 800.

When the number of the pre-registered web pages is greater than the maximum number of thumbnail images, thumbnail images may be displayed with at least two divided screens.

Figure 13:
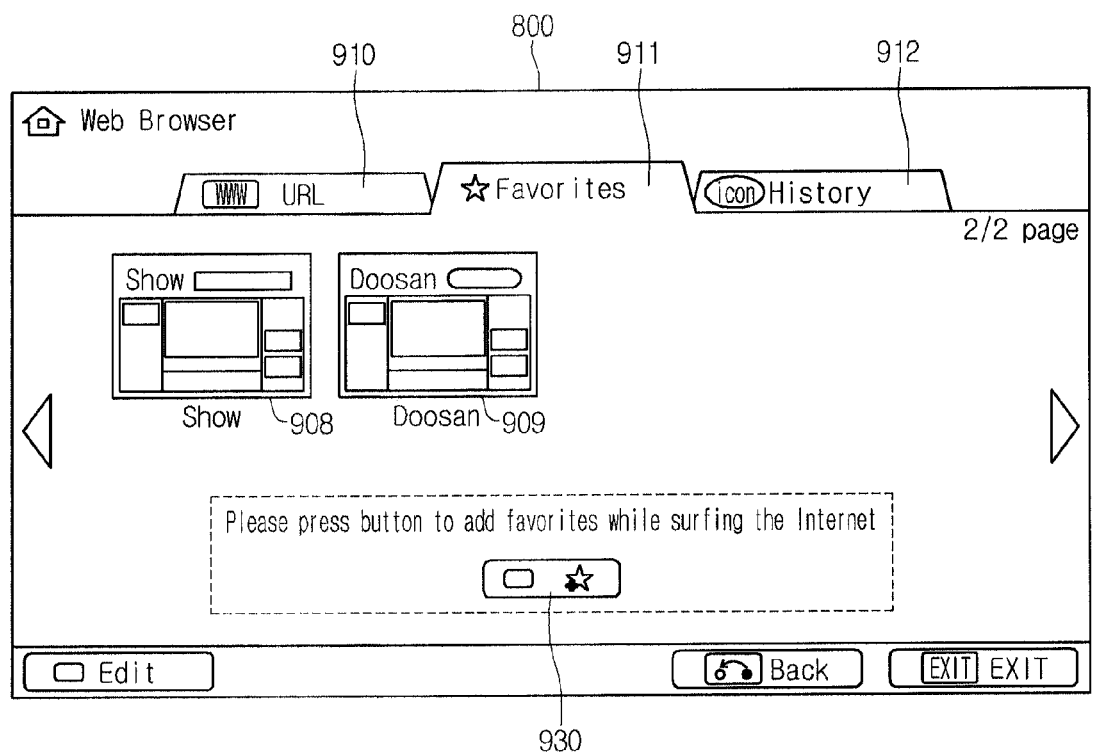

Referring to FIG. 13, when the number of web pages pre-registered by a user's request is 10, which is greater than the maximum number of 8, two thumbnail images not displayed on the first screen may be displayed on the next screen.

For example, when a user selects a direction key for moving a screen by using a navigation key in the remote control device 200 or the pointer 205, the remaining thumbnail images not displayed on the first screen may be confirmed on the next screen as shown in FIG. 13.

As shown on the screen 800 of FIG. 13, while surfing a specific web page via Internet, a user may select a favorite registration button 930 displayed on the screen 800 in order to register a corresponding web page.

As mentioned above, when a user requests a registration for specific web page, the Uniform Resource Locator (URL) of the registration requested web page is stored in the storage unit 140, and together with it, a thumbnail image corresponding to the web page may be generated and stored in the storage unit 140.

For example, when a user selects the favorite registration button 930 during surfing of a specific web page, the web page displayed on a screen at the selection point is captured and generated as the thumbnail image. The generated thumbnail image may be stored in correspondence to the web page.

The thumbnail images stored through the above method may be displayed on the screen 800 in response to the user's selection of the web browser application, and a user may easily confirm pre-registered webs by using thumbnail images displayed on the screen 800.

Then, the user interface unit 150 receives a selection on one of the thumbnail images displayed on the screen 800 from a user in operation S720, and the display unit 180 displays a web page corresponding to the selected thumbnail image in operation S730.

For example, a user may select a first thumbnail image 900 corresponding to a "Naver" web page on the screen 800 shown in FIG. 12 by using the navigation keys in the remote control device 200 or the pointer 205 that moves according to the movement of the remote control device 200.

In this case, the network interface unit 133 receives the URL of the "Naver" web page corresponding to the selected first thumbnail image 900 from the storage unit 140, and then accesses the server that provides the "Naver" web page by using the inputted URL in order to receive web page data.

Hereinafter, with reference to FIGS. 14 to 18, a method of editing a thumbnail image in a web browser will be described according to an embodiment of the present invention.

Figure 14:
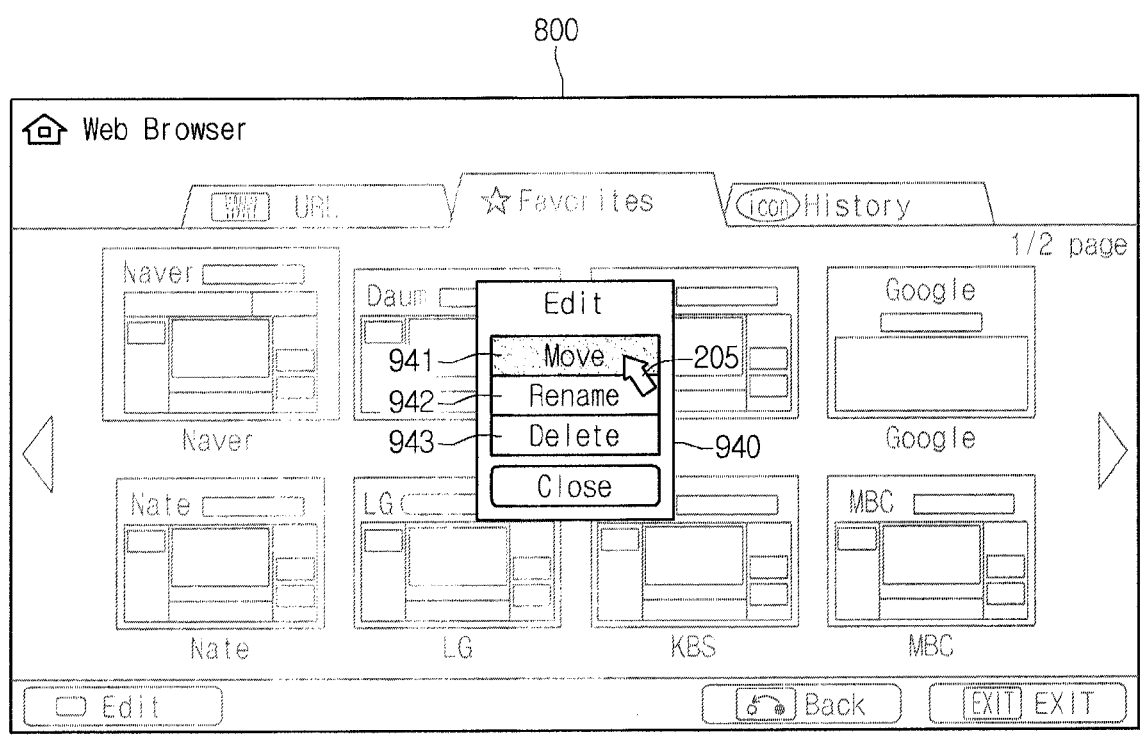
FIGS. 14 to 18 are views illustrating a method of editing a thumbnail image in a web browser according to an embodiment of the present invention.

Referring to FIG. 14, when a user selects an "Edit" button 920 displayed on the screen 800, an edit menu window 940 for editing a thumbnail in a web browser may be displayed on the screen 800.

Moreover, the edit menu window 940 may include a "Move" item 941 for moving the position of a specific thumbnail image, a "Rename" item 942 for changing the name of a specific thumbnail image, and a "Delete" item 943 for deleting a specific thumbnail image.

By moving the pointer 205 to select the "Move" item 941 displayed in the edit menu window 940 and then dragging a thumbnail image to be moved to drop it in a desired position, a user may move a corresponding thumbnail image.

Figure 15:
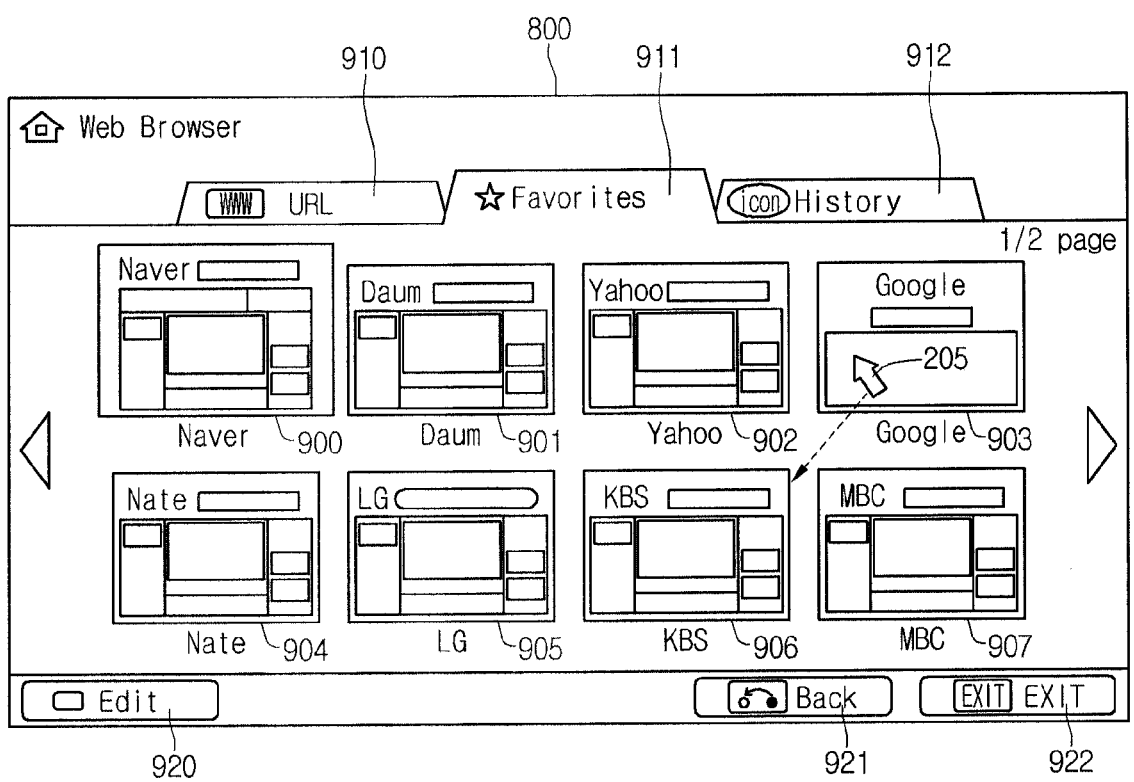

Referring to FIG. 15, a user positions the pointer 205 on a fourth thumbnail image 903 corresponding to a "Google" web page in order to select it and then, drags the fourth thumbnail image 903 and drops it between the seventh thumbnail image 906 and the eighth thumbnail image 907.

Figure 16:
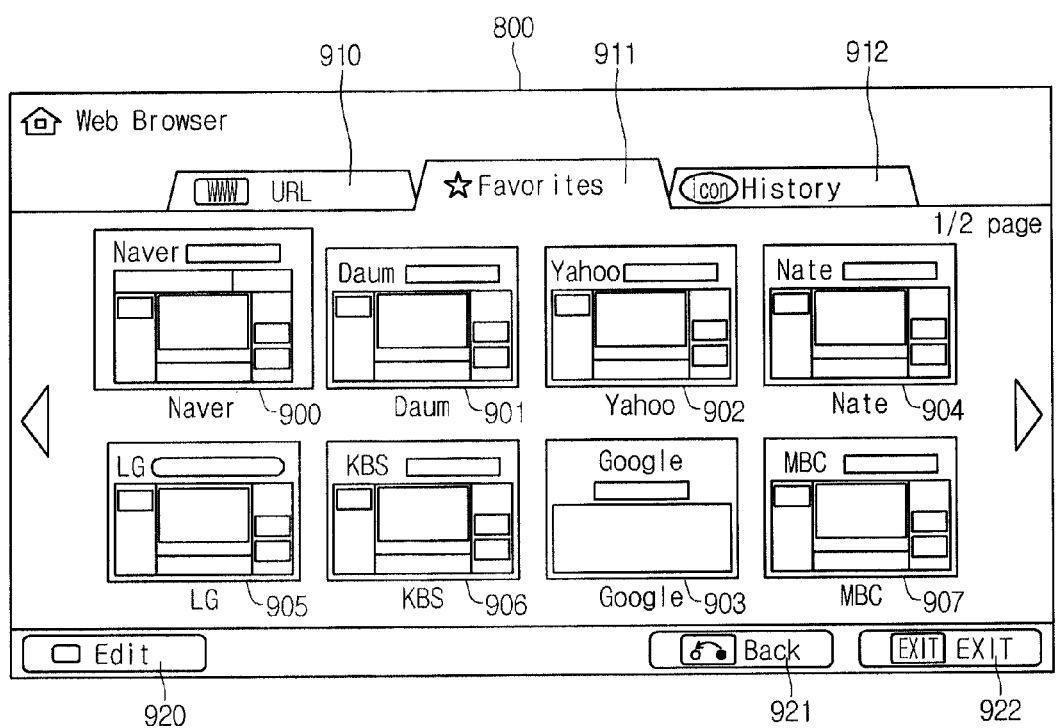

In this case, as shown in FIG. 16, the fourth thumbnail image 903 corresponding to the "Google" web page may be positioned between the seventh image 906 and the eighth thumbnail image 907.

Figure 17:
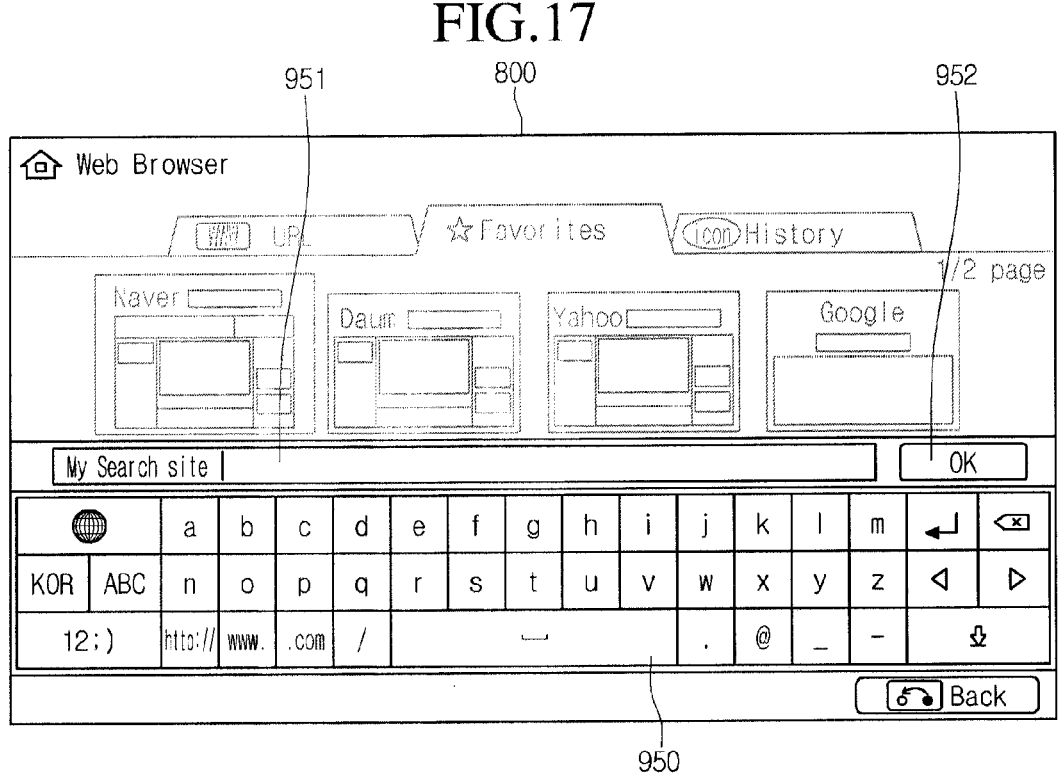

Moreover, when a user moves the pointer 205 to select a "Rename" item 942 displayed on the edit menu window 940, as shown in FIG. 17, a screen keyboard 950 for inputting a changed name of a thumbnail image may be displayed on the screen 800.

A user may select buttons in the screen keyboard 950 through the remote control device 200 in order to input the name that the user wants to change in an input field 951. Then, when the input is completed, the user may select an "OK" button 952 in order to apply the changed name to a corresponding thumbnail image.

Figure 18:
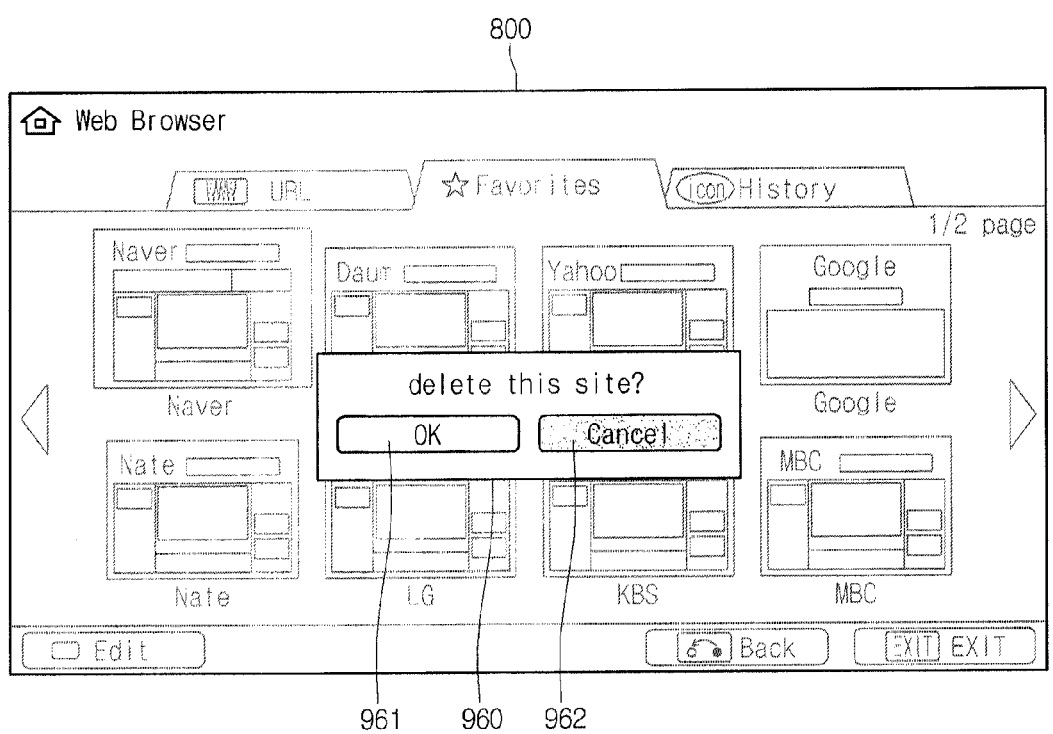

Moreover, when a user moves the pointer 205 to select a "delete" item 942 displayed on the edit menu window 943, as shown in FIG. 18, a delete confirmation window 960 for confirming whether a thumbnail image is deleted may be displayed.

A user selects a thumbnail image to be deleted and presses the "Edit" button 920. Then, the user selects the "delete" item 943 of the edit menu window 940 displayed on the screen and selects the "OK" button 961 from the delete confirmation window 960 as shown in FIG. 18 in order to delete the selected thumbnail image from the web browser.

Figure 19:
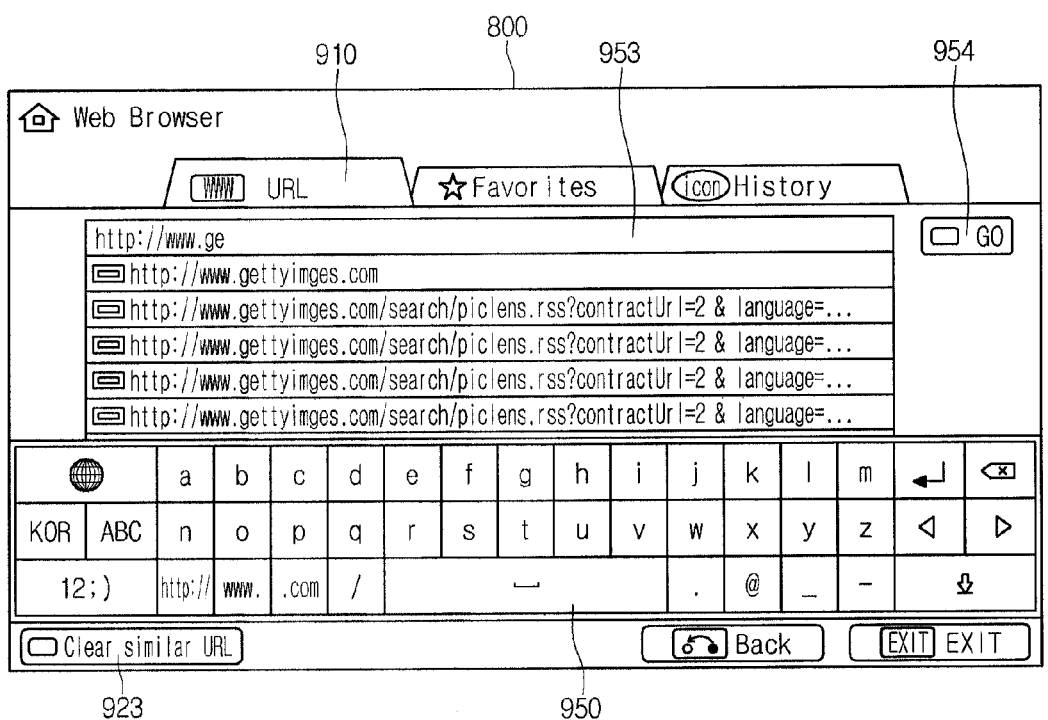
FIGS. 19 and 20 are views illustrating a method of receiving the URL of a web page according to an embodiment of the present invention.

FIG. 19 is a view illustrating a method of receiving the URL of a web page to be accessed according to an embodiment of the present invention.

Referring to FIG. 19, when a user selects an "Edit" button 920 displayed on the screen 910, an edit menu window 950 for editing a thumbnail in a web browser may be displayed on the screen 800.

A user may select buttons in the screen keyboard 950 through the remote control device 200 in order to input the URL of a web page to be accessed into a URL input window 953. Then, when the input is completed, the user may select a "GO" button 954 in order to display a web page corresponding to the inputted URL.

Moreover, a user may select a "Clear similar URL" button 923 displayed on the screen 800 in order to delete information on URLs similar to the URL inputted into the URL input window 953 from the storage unit 140.

Figure 20:
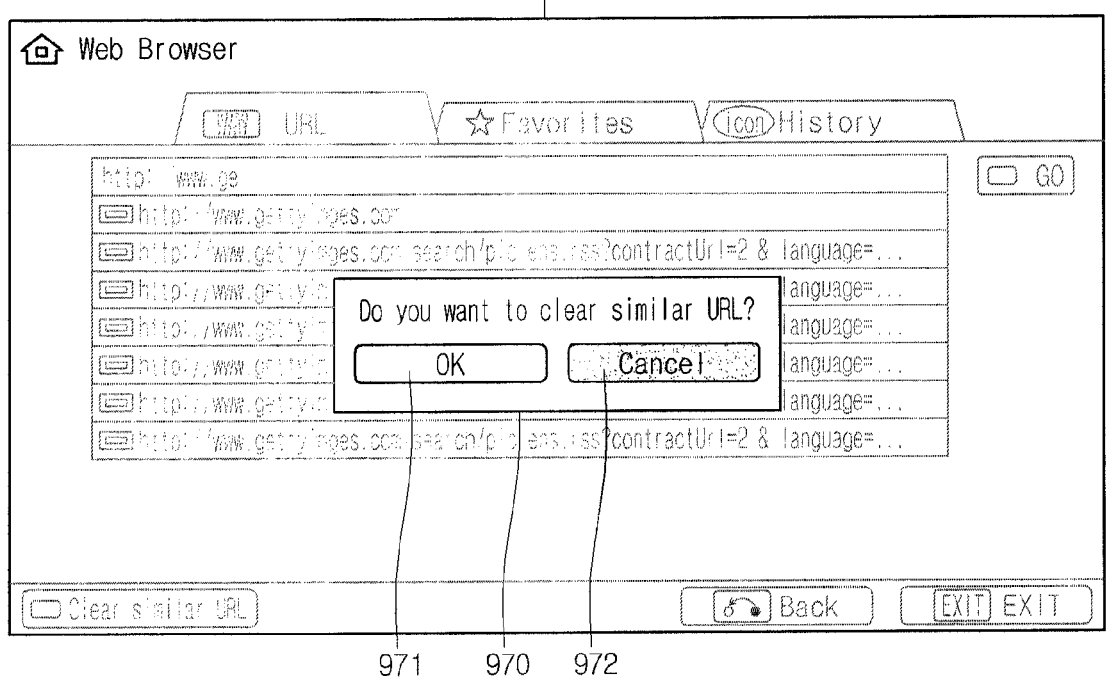

When a user inputs a URL into the URL input window 953 and then selects the "Clear similar URL" button 923, as shown in FIG. 20, a delete confirmation window 970 for confirming whether similar URLs are deleted may be displayed.

A user may select an "OK" button 971 in the delete confirmation window 970 in order to delete history information on URLs similar to the inputted URL from the storage unit 140.

Figure 21:
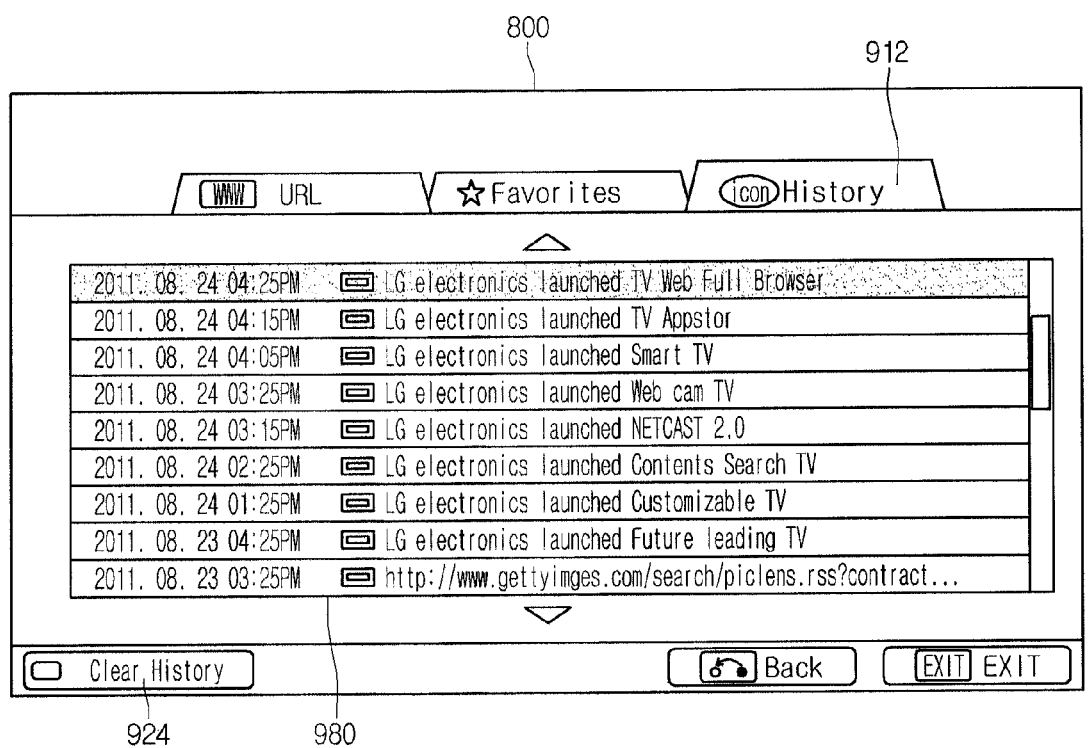
FIG. 21 is a view illustrating a method of displaying web page access history information according to an embodiment of the present invention.

FIG. 21 is a view illustrating a method of displaying web page access history information according to an embodiment of the present invention.

Referring to FIG. 21, when a user selects a "History" item 920 among option items displayed in a web browser, a history information window 980 including history information on previously-accessed web pages may be displayed on the screen 800.

As shown in FIG. 21, the history information window 980 may include an access date, an access time, and a web page name for each of previously-accessed web pages.

Moreover, a user may select a "Clear History" button 924 displayed on the screen 800 in order to delete web page access history information in the history information window 980 from the storage unit 140.

For example, a user may select a specific access history and then select the "Clear History" button 924 in order to delete a corresponding access history or entire history information.

Figure 22:
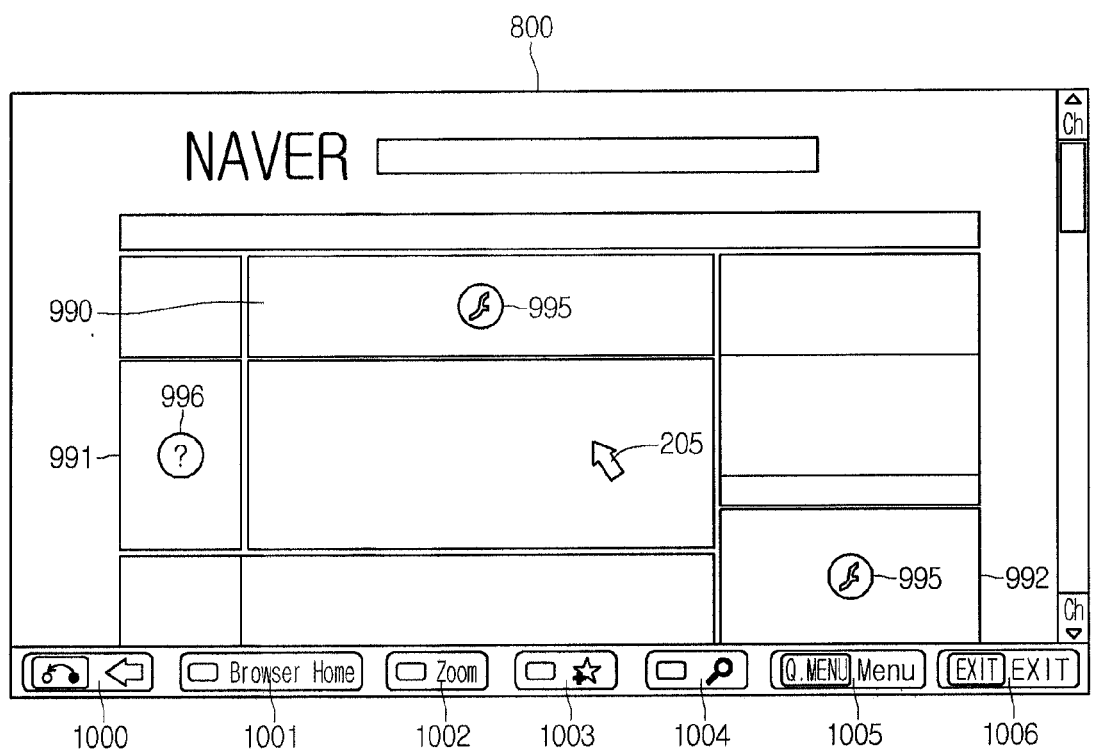
FIGS. 22 and 23 are views illustrating a method of displaying a web page on a screen according to an embodiment of the present invention.

FIG. 22 is a view illustrating a method of displaying web page on a screen according to an embodiment of the present invention.

Referring to FIG. 22, when a user selects a first thumbnail image 900 on the screen 800 shown in FIG. 12, a "Naver" web page corresponding to the selected first thumbnail image 900 may be displayed on the screen 800.

Moreover, if there are contents that the display unit 180 cannot play among web page data received through the network interface unit 133, an icon representing a corresponding contents type may be displayed in an area where corresponding contents are supposed to be displayed.

For example, if the display unit 180 of the video display device 100 cannot play flash type contents, flash icons 995 may be displayed in correspondence to areas 990 and 992 where corresponding flash contents are supposed to be displayed.

Additionally, if the contents type that the display unit 180 cannot play may not be confirmed, a "?" icon 996 may be displayed in correspondence to an area 991 where corresponding contents are supposed to be displayed.

Moreover, user selectable menu buttons 1000 to 1006 may be displayed at the bottom of the screen 800 that displays the web page.

A user selects a "back" button 1000 among the menu buttons 1000 to 1006 displayed on the screen 800 in order to display the web page displayed immediately prior to the current web page.

Additionally, a user selects a "Browser Home" button 1001, so that the web browser may return to the screen 800 as shown in FIG. 12.

Moreover, a user selects a "Zoom" button 1002, so that a web page may be enlarged and displayed on the screen 800. For example, each time the "Zoom" button 1002 is selected, the web page may be enlarged by a predetermined percentage.

As mentioned above, a user selects a "favorite registration" button 1003, so that the URL and thumbnail image for a web page displayed on the current screen 800 may be stored in the storage unit 140.

In this case, the favorite registered web page is included in the web browser as shown in FIG. 12, so that a corresponding thumbnail image may be displayed together with the thumbnail images of other registration web pages.

Moreover, the thumbnail image may be generated by capturing the web page displayed on the screen 800 at the timing of when a user selects the "favorite registration" button 1003, and may be stored in the storage unit 140 together with the URL of a corresponding web page.

Additionally, a user may select a "search" button 1004 in order to search a web page through a preset search server, and may select a "Q.MENU" button 1005 in order to directly input the URL of a web page that the user wants to access.

Additionally, a user may select an "EXIT" button 1005 in order to return to the home screen as shown in FIG. 11.

According to an embodiment of the present invention, a user may move a web page displayed on the screen 800 to a specific direction through the remote control device 200.

Figure 23:
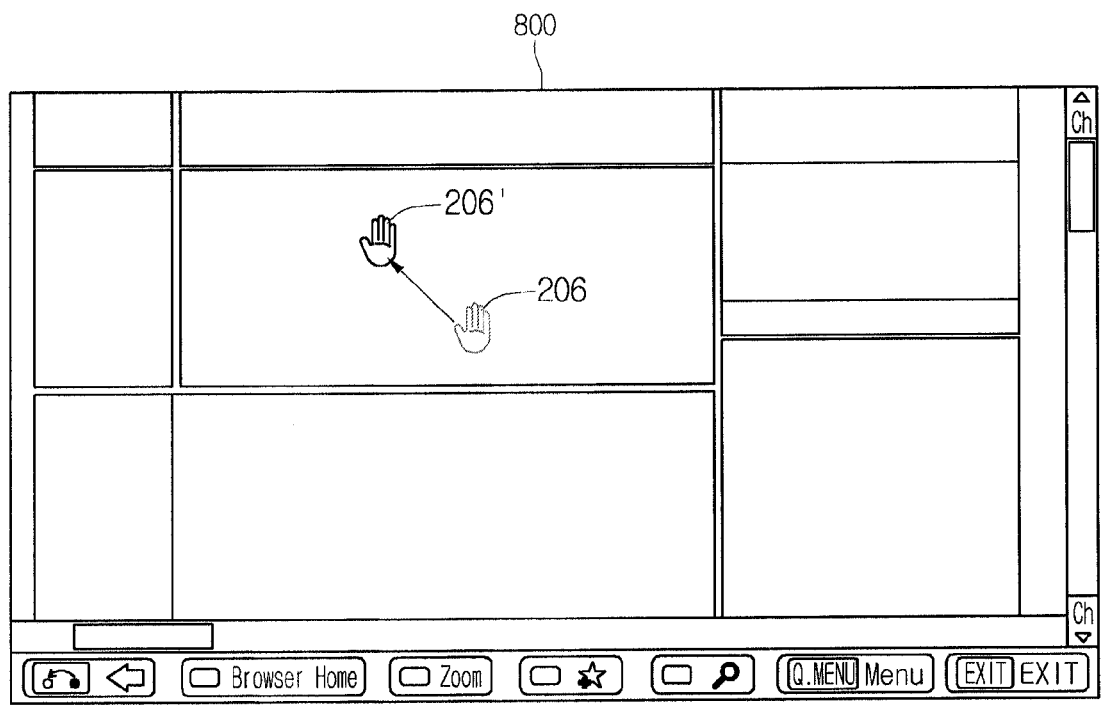

Referring to FIG. 23, a user may press a button in the remote control device 200 for more than a predetermined standard time in order to display the pointer 206 representing a web page moving mode on the screen 800.

Then, a user may move the pointer 206 to a specific direction by moving the remote control device 200, in order to move the web page displayed on the screen 800 along the moving direction of the pointer 206.

The method of moving a web page described with FIG. 13 is just one example of the present invention. For example, a user may move a web page displayed on the screen 800 to a specific direction by using the navigation buttons or the channel up/down buttons in the remote control device 200.

Hereinafter, with reference to FIGS. 24 and 25, a method of displaying a plurality of web pages on a screen will be described according to an embodiment of the present invention.

Figure 24:
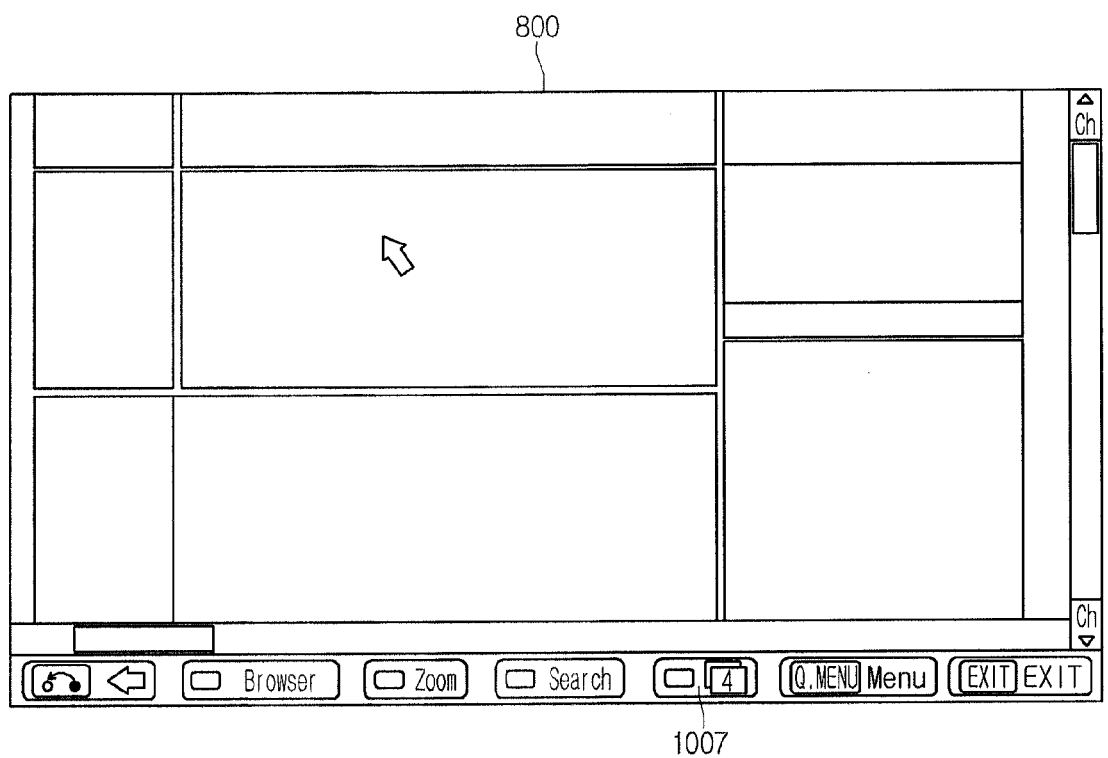
FIGS. 24 and 25 are views illustrating a method of displaying a plurality of web pages on a screen according to an embodiment of the present invention.

Referring to FIG. 24, a button 1007 for representing the number of currently-opened web pages may be positioned at the bottom of the screen 800 including a web page displayed.

For example, when a user currently opens four web pages in the video display device 100, as shown in FIG. 24, the number "4" may be displayed on the button 1007 representing the number of web pages as shown in FIG. 24.

Figure 25:
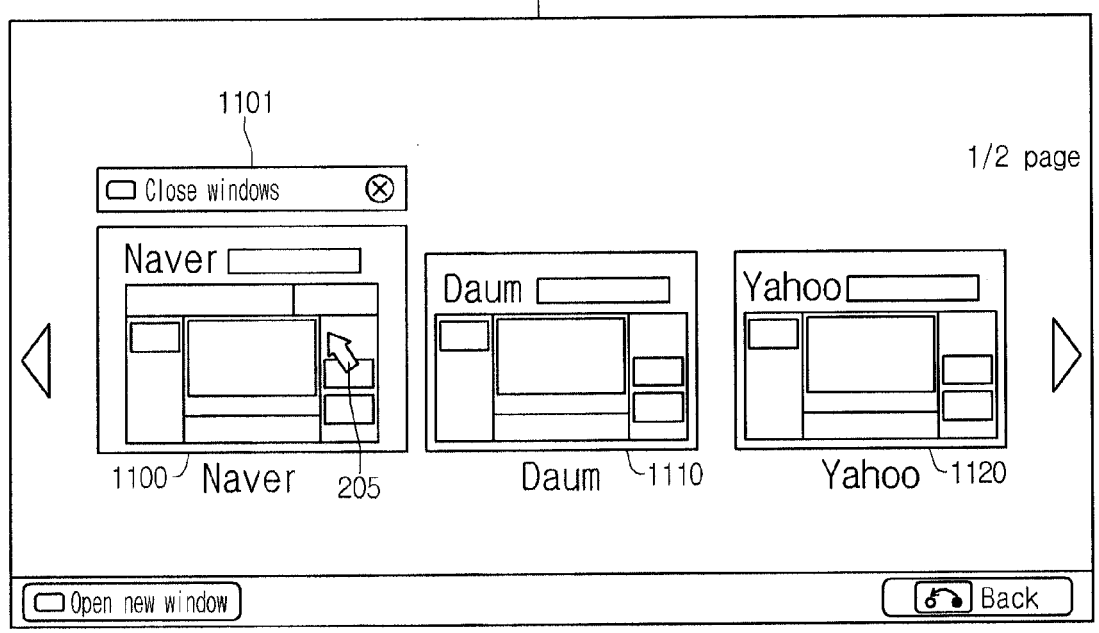

When a user selects the button 1007 representing the number of web pages, as shown in FIG. 25, thumbnail images 1100, 1110, and 1120 corresponding to the currently-opened web pages may be displayed on the screen 800.

When the number of the currently-opened web pages is greater than the maximum number of thumbnail images to be displayed on one screen, thumbnail images may be displayed with at least two divided screens.

Additionally, a user may select one of the thumbnail images 1100, 1110, and 1120 displayed on the screen 800 through the pointer 205, and accordingly, the web page corresponding to the selected thumbnail image may be displayed on the entire screen 800.

As shown in FIG. 25, when a user positions the pointer 205 on the thumbnail image 1100, a "Close window" button for closing a corresponding web page may be displayed adjacent to the corresponding thumbnail image 1100.

A user may select the "Close window" button 1101 in order to close a web page corresponding to the adjacent thumbnail image 1100, and accordingly, the number of currently-opened web pages is reduced to 3.

Figure 26:
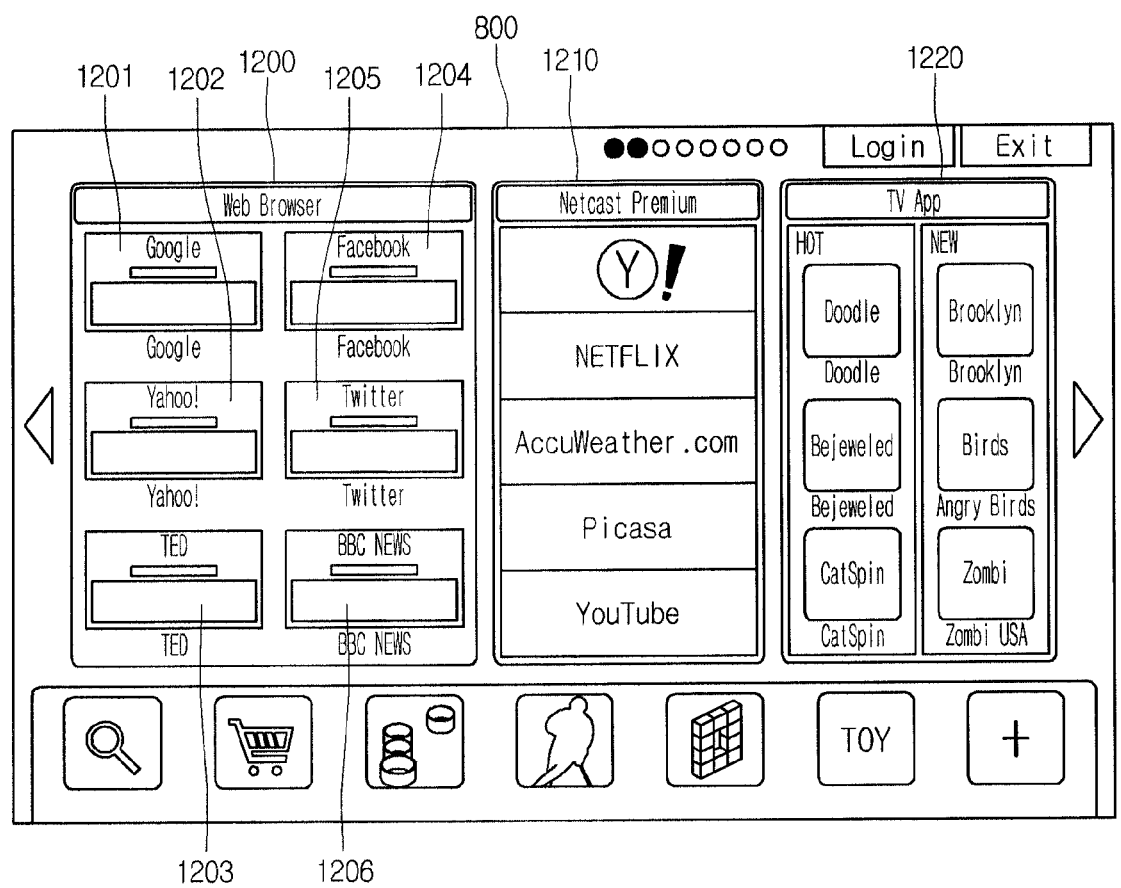
FIG. 26 is a view illustrating a configuration of a home screen displayed on a video display device according to another embodiment of the present invention.

FIG. 26 is a view illustrating a configuration of a home screen displayed on a video display device according to another embodiment of the present invention.

Referring to FIG. 26, a plurality of card objects 1200, 1210, and 1220 may be displayed on the home screen of the video display device 100, and the card objects 1200, 1210, and 1220 may include a "Web Browser" card object 1200 representing a plurality of web page items.

A plurality of web pages included in the "Web Browser" card object 1200 may be web pages that are pre-registered by the manufacturer of the video display device 100 or are added by a user.

The user may select one of the plurality of web pages in the "Web Browser" card object 1200 in order to display a corresponding web page on the screen 800.

According to an embodiment of the present invention, the thumbnail image in the web browser shown in FIG. 12 may represent whether a corresponding web page is included in the "Web Browser" card object 1200.

Figure 27:
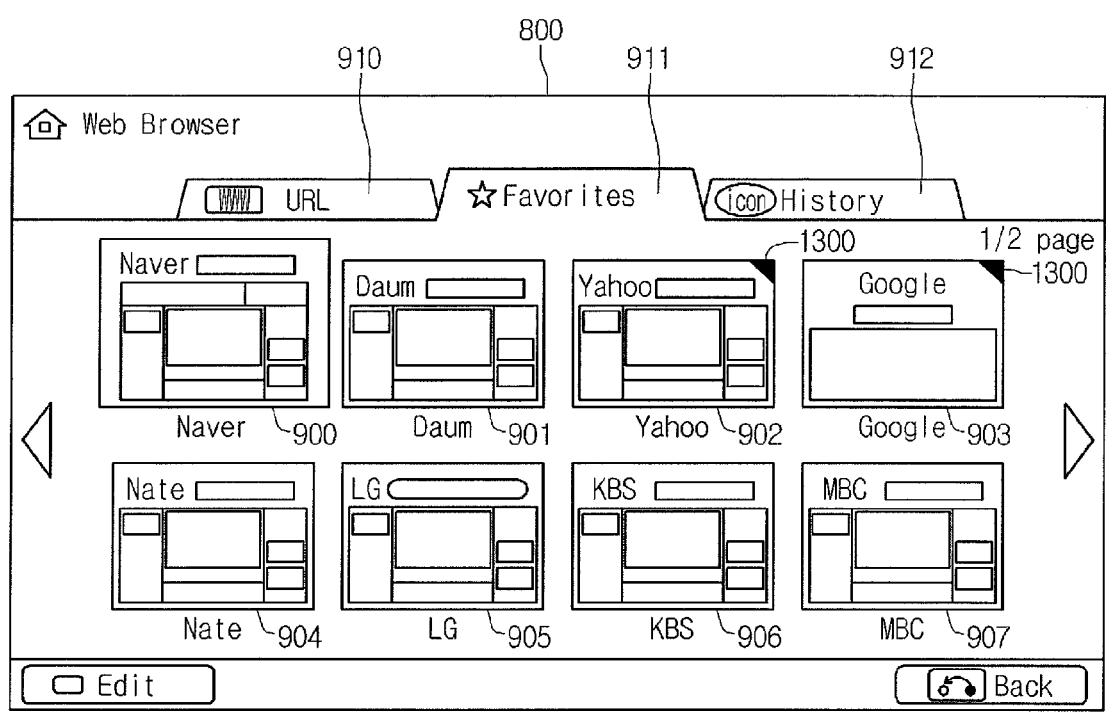
FIG. 27 is a view illustrating a method of displaying a web browser according to another embodiment of the present invention.

Referring to FIG. 27, "Yahoo" and "Google" among web pages whose thumbnail images are displayed on a web browser are web pages included in the "Web Browser" card object 1200 shown in FIG. 26. Identification marks 1300 indicating that information may be respectively displayed on third thumbnail image 902 and the fourth thumbnail image 903 corresponding to the "Yahoo" and "Google".

According to another embodiment of the present invention, a user may perform a drag and drop operation on at least two desired thumbnail images on the screen 800 shown in FIG. 12, in order to mix at least two web pages and display it on the screen 800 together with the thumbnail images.

Hereinafter, with reference to FIGS. 28 and 31, a method of mixing and displaying at least two web pages will be described according to an embodiment of the present invention.

Figure 28:
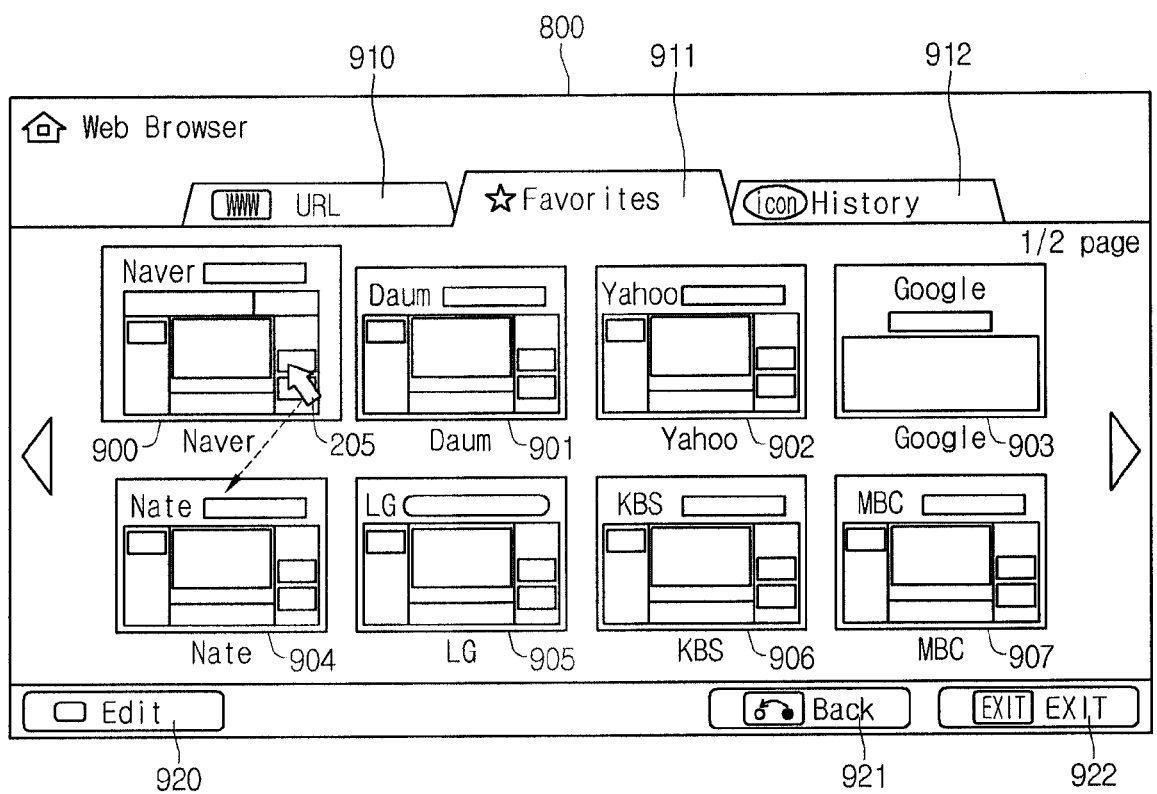
FIGS. 28 to 31 are views illustrating a method of mixing and displaying at least two web pages according to an embodiment of the present invention.

Referring to FIG. 28, a user positions the pointer 205 on a first thumbnail image 900 through the remote control device 200, and drags the selected first thumbnail image 900 and drops it at a position where the fifth thumbnail image 904 is displayed.

Accordingly, a "Naver" web page corresponding to the dragged first thumbnail image 900 and a "Nate" web page corresponding to the fifth thumbnail image 900, i.e. the drop position", are mixed and then displayed on one screen simultaneously.

Figure 29:
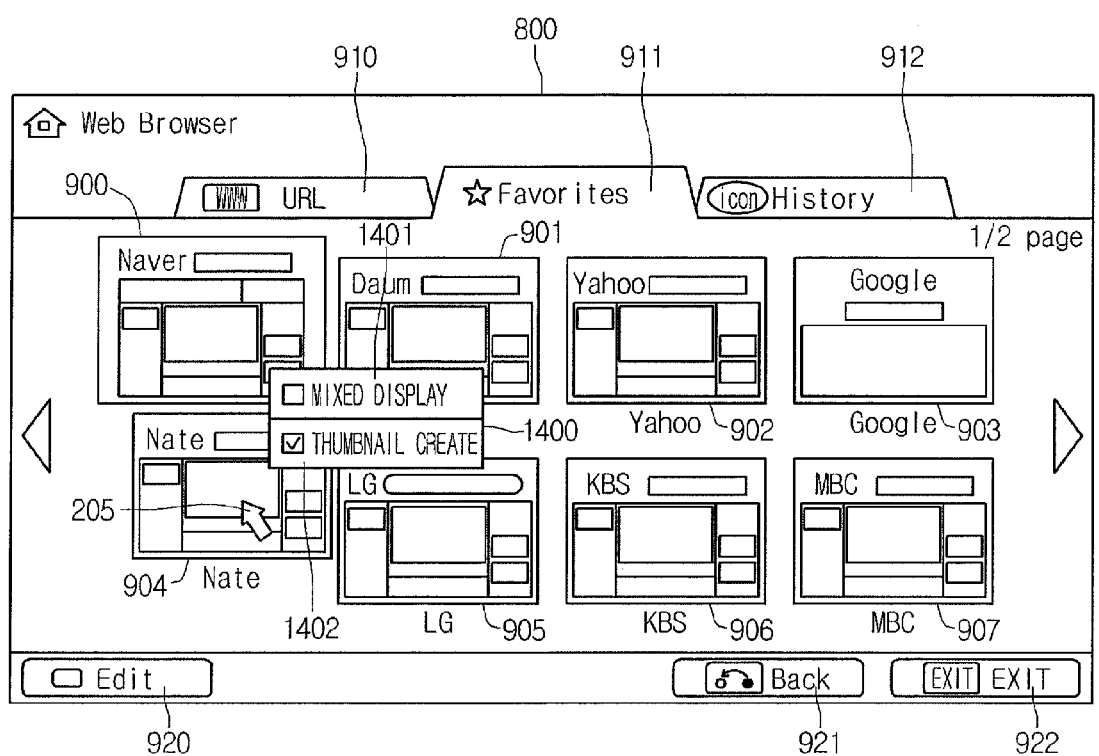

Referring to FIG. 29, when a user drags the first thumbnail image 900 and then drops it at the position where the fifth thumbnail image 904 is displayed, in correspondence to the drag and drop operation, an option selection window 1400 including user-selectable option items may be displayed on the screen 800.

Figure 30:
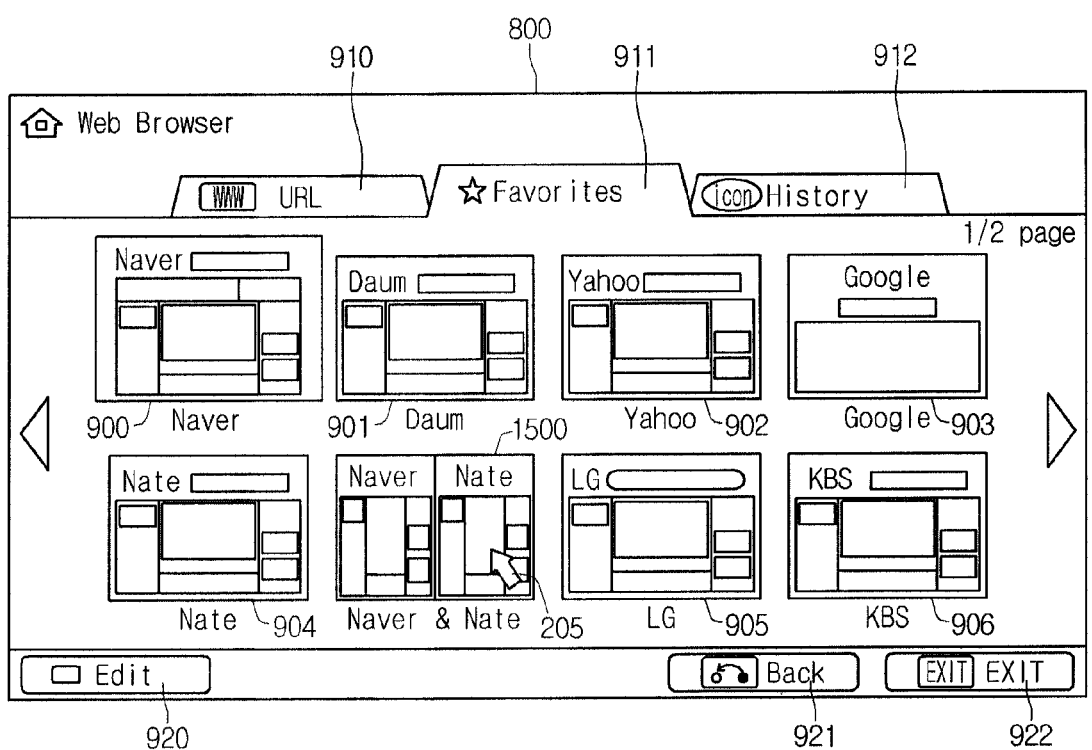

A user may select a "thumbnail create" item 1402 among menu items of the option selection window 1400, in order to create a mixed thumbnail image 1500 corresponding to the "Naver" web page and the "Nate" web page, as shown in FIG. 30.

Figure 31:
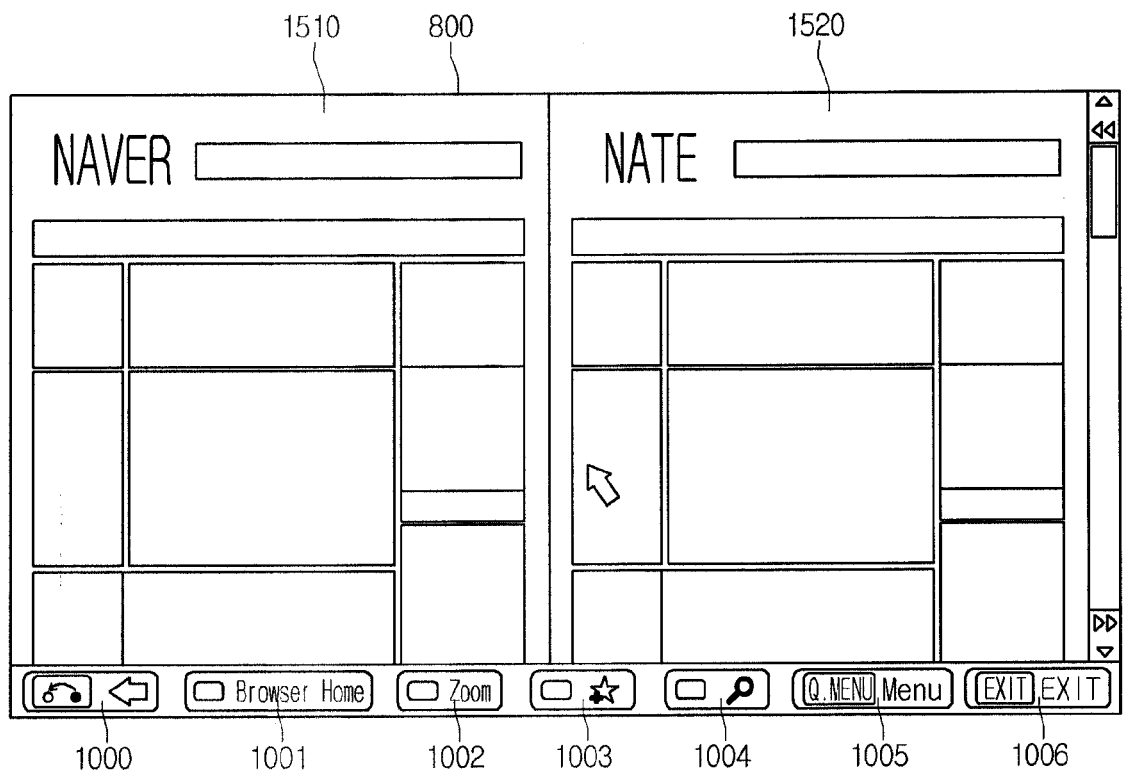

Moreover, when a user selects the mixed thumbnail image 1500, the "Naver" web page and the "Nate" web page corresponding to the mixed thumbnail image 1500 may be displayed on the screen 800 simultaneously as shown in FIG. 31.

Moreover, when a user selects a "mixed display" item 1401 on the screen shown in FIG. 29, the "Naver" web page and the "Nate" web page may be displayed on the screen 800 simultaneously as shown in FIG. 31.

Figure 32:
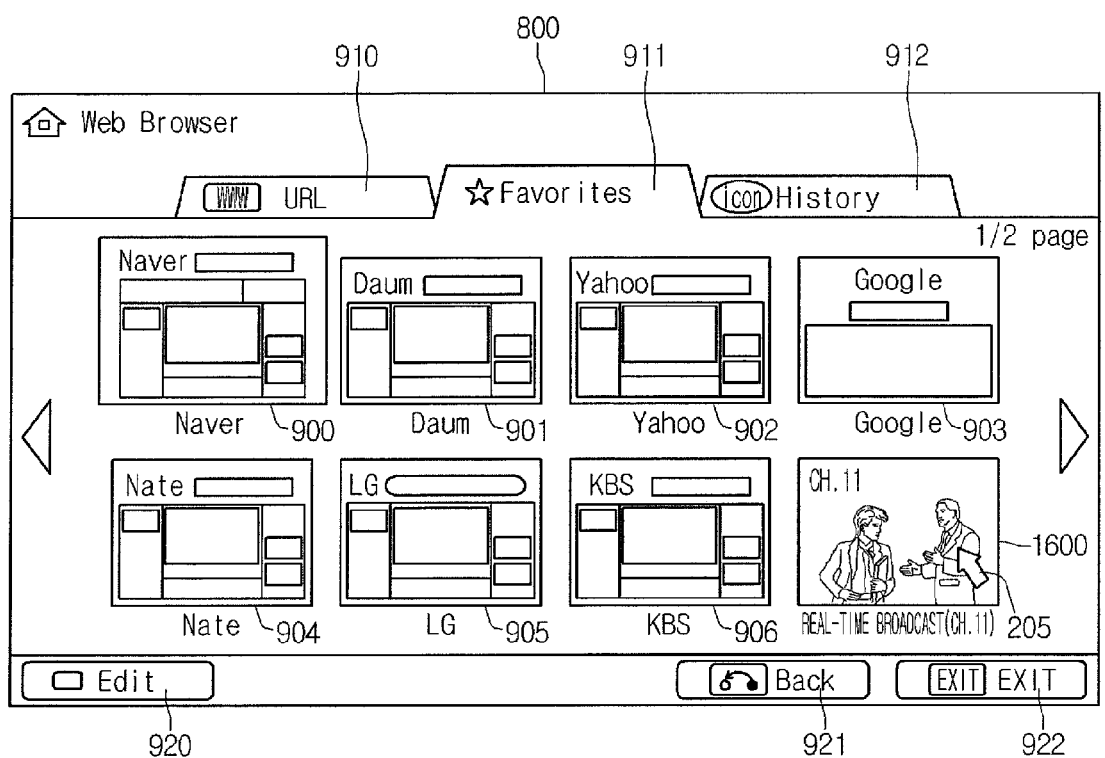
FIG. 32 is a view illustrating a method of displaying a web browser according to another embodiment of the present invention.

FIG. 32 is a view illustrating a method of displaying a web browser according to another embodiment of the present invention.

Referring to FIG. 32, a thumbnail image 1600 of a real-time broadcast video may be displayed on a web browser together with thumbnail images 900 to 906 corresponding to a plurality of web pages.

A user may select the thumbnail image 1600 of a real-time broadcast video in the web browser by using the pointer 205, in order to display a video of a broadcast channel "CH.11" on the screen 800.

The web browsing method of a video display device according to the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices, and further includes carrier waves (such as data transmission through the Internet).

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of performing web browsing in a video display device, the method comprising:
receiving a broadcast signal;
displaying a plurality of icons on a screen, wherein the plurality of icons comprise a web browsing icon corresponding to a web browsing application;
receiving a user input selecting the web browsing icon;
displaying a web browser on the screen, in accordance with the user input selecting the web browsing icon;
displaying a plurality of web page thumbnail images respectively corresponding to a plurality of web pages together with a thumbnail image corresponding to a broadcast video, on the screen, wherein the plurality of web page thumbnail images comprises a first web page thumbnail image corresponding to a first web page and a second web page thumbnail image corresponding to a second web page;
receiving a user input selecting the first web page thumbnail image and the second web page thumbnail image;
displaying a mixed thumbnail image corresponding to the first web page and the second web page; and
displaying the broadcast video on the screen, in accordance with a user input selecting the thumbnail image corresponding to the broadcast video being received, and displaying the first web page and the second web page simultaneously in accordance with a user input selecting the mixed thumbnail image being received.

2. The method according to claim 1, wherein the plurality of thumbnail images are generated by capturing a web page displayed on the screen when a favorite registration button displayed on the screen is selected.

3. The method according to claim 1, further comprising:
receiving a first input selecting one of the plurality of web page thumbnail images;
displaying a web page corresponding to a web page thumbnail image selected by the first input, on the web browser.

4. The method according to claim 3, further comprising:
displaying a pointer on the web page, based on pressing of a button on the remote control device; and moving the web page on the screen, in accordance with the remote control device being moved.

5. The method according to claim 1, further comprising:
displaying an image button representing web page thumbnail images of all currently-opened web pages, on the web browser;
receiving a selection of the image button; and
displaying simultaneously the web page thumbnail images of all the currently-opened web pages based on the selection of the image button, on the web browser, wherein the image button displays a numeral that represents a number of all the currently-opened web pages.

6. A video display device comprising:
a tuner configured to receive a broadcast signal;
a display unit configured to display a plurality of icons on a screen, wherein the plurality of icons comprise a web browsing icon corresponding to a web browsing application;
a user interface unit configured to receive a user input selecting the web browsing icon;
a storage unit configured to store a plurality of web page thumbnail images respectively corresponding to a plurality of web pages and a plurality of URLs respectively corresponding to the plurality of web pages;
a network interface unit configured to access a corresponding server by using the plurality of URLs; and
a control unit configured to:
display a web browser on the screen in accordance with the user input selecting the web browsing icon,
display the plurality of web page thumbnail images together with a thumbnail image corresponding to a broadcast video on the screen, wherein the plurality of web page thumbnail images comprises a first web page thumbnail image corresponding to a first web page and a second web page thumbnail image corresponding to a second web page,
receive a user input selecting the first web page thumbnail image and the second web page thumbnail image,
display a mixed thumbnail image corresponding to the first web page and the second web page, and
display the broadcast video on the screen in accordance with a user input selecting the thumbnail image corresponding to the broadcast video being received, and display the first web page and the second web page simultaneously in accordance with a user input selecting the mixed thumbnail image being received.

7. The video display device according to claim 6, wherein the plurality of web page thumbnail images are generated by capturing a web page displayed on the screen when a favorite registration button displayed on the screen is selected.

8. The method according to claim 1, wherein the thumbnail image corresponding to the broadcast video is a thumbnail image of a real-time broadcast video.

9. The method according to claim 1, wherein the displaying the plurality of icons comprises displaying a home screen including the plurality of icons respectively corresponding to a plurality of applications and a broadcast video included in the received broadcast signal.

10. The method according to claim 9, further comprising:
receiving a move input for the home screen; and
displaying the home screen including the plurality of icons and the broadcast video included in the received broadcast signal, according to the move input for the home screen.

11. The method according to claim 1, wherein the displaying the plurality of web page thumbnail images comprises displaying a broadcast video included in the received broadcast signal on the screen.

12. The method according to claim 1, wherein the displaying the plurality of web page thumbnail images comprises:
displaying a first screen including some of the plurality of web page thumbnail images on the web browser, if the number of pre-registered web pages is greater than a maximum number of thumbnail images displayed on the web browser; and
in accordance with a user input to display the others of the plurality of web page thumbnail images, changing the first screen to a second screen including the others of the plurality of web page thumbnail images.

13. The method according to claim 1, further comprising:
receiving a user input to change a name of a first web page thumbnail image among the plurality of web page thumbnail images; and
displaying an input window where a changed name of the first web page thumbnail image is input, in accordance with the user input to change the name of the first web page thumbnail image.

14. The method according to claim 1, wherein the displaying the plurality of web page thumbnail images comprises displaying history information for each of previously-accessed web pages on the web browser, and
wherein the history information is deleted according to a user input.

15. The video display device according to claim 6, wherein the control unit is further configured to receive a first input selecting one of the plurality of web page thumbnail images through the user interface unit, and control the display unit to display a web page corresponding to a web page thumbnail image selected by the first input on the web browser.

16. The video display device according to claim 15, wherein the control unit is further configured to control the display unit to display a pointer on the web page, based on pressing of a button on a remote control device, and control the display unit to display moving of the web page on the screen, in accordance with the remote control device being moved.

17. The video display device according to claim 6, wherein the control unit is further configured to control the display unit to display an image button representing web page thumbnail images of all currently-opened web pages on the web browser, receive a selection of the image button through the user interface unit, and control the display unit to display simultaneously the web page thumbnail images of all the currently-opened web pages on the web browser, based on the selection of the image button,
wherein the image button displays a numeral that represents a number of all the currently-opened web pages.

18. The video display device according to claim 6, wherein the thumbnail image corresponding to the broadcast video is a thumbnail image of a real-time broadcast video.

19. The video display device according to claim 6, wherein the control unit is further configured to control the display unit to display a home screen including the plurality of icons respectively corresponding to a plurality of applications and a broadcast video included in the received broadcast signal.

20. The video display device according to claim 19, wherein the control unit is further configured to receive a move input for the home screen through the user interface unit, and control the display unit to display the home screen including the plurality of icons and the broadcast video included in the received broadcast signal, according to the move input for the home screen.

21. The video display device according to claim 6, wherein the control unit is further configured to control the display unit to display a broadcast video included in the received broadcast signal on the screen.

22. The video display device according to claim 6, wherein the control unit configured to control the display unit to display a first screen including some of the plurality of web page thumbnail images on the web browser, if the number of pre-registered web pages is greater than the maximum number of thumbnail images displayed on the web browser, and to change the first screen to a second screen including the others of the plurality of web page thumbnail images, in accordance with a user input to display the others of the plurality of web page thumbnail images being received.

23. The video display device according to claim 6, wherein the control unit is further configured to receive a user input to change a name of a first web page thumbnail image among the plurality of web page thumbnail images through the user interface unit, and control the display unit to display an input window where a changed name of the first web page thumbnail image is input, in accordance with the user input to change the name of the first web page thumbnail image being received.

24. The video display device according to claim 6, wherein the control unit is further configured to control the display unit to display history information for each of previously-accessed web pages on the web browser, and
wherein the history information is deleted according to a user input.

* * * * *